United States Patent [19]
Beck

[11] Patent Number: 5,595,269
[45] Date of Patent: Jan. 21, 1997

[54] VIBRATION DAMPER FOR A MOTOR VEHICLE

[75] Inventor: Hubert Beck, Eitorf, Germany

[73] Assignee: Fichtel & Sachs AG, Eitorf, Germany

[21] Appl. No.: 389,344

[22] Filed: Feb. 16, 1995

Related U.S. Application Data

[63] Continuation-in-part of Ser. No. 239,365, May 6, 1994.

[30] Foreign Application Priority Data

| May 10, 1993 | [DE] | Germany | 43 15 458.1 |
| May 10, 1993 | [DE] | Germany | 43 15 457.3 |
| Feb. 16, 1994 | [DE] | Germany | 44 04 835.1 |

[51] Int. Cl.⁶ ............................................. F16F 9/50
[52] U.S. Cl. .................. 188/282; 188/317; 188/322.15
[58] Field of Search ........................... 188/299, 281, 188/282, 317, 319, 322.15, 322.14; 280/707, 714

[56] References Cited

U.S. PATENT DOCUMENTS

| 3,113,644 | 12/1963 | Wossner | 188/322.15 |
| 4,685,545 | 8/1987 | Fannin et al. | 188/319 X |
| 4,905,799 | 3/1990 | Yamaoka et al. | 188/322.15 |
| 5,042,624 | 8/1991 | Furuya et al. | 188/322.15 X |
| 5,072,812 | 12/1991 | Imaizumi | 188/322.15 X |
| 5,154,263 | 10/1992 | Lizell | 188/319 X |
| 5,207,300 | 5/1993 | Engel et al. | 188/322.15 X |

FOREIGN PATENT DOCUMENTS

| 2061905 | 6/1971 | France . |
| 2500826 | 7/1976 | Germany . |

Primary Examiner—Lee W. Young
Attorney, Agent, or Firm—Nils H. Ljungman and Associates

[57] ABSTRACT

A damping valve, in particular for a vibration damper for a motor vehicle, has a damping valve body with at least one admission channel for each direction of flow through the valve body. The admissions channel connectes a top side and a bottom side of the damping valve body to one another. There can also be a valve plate on a valve seat surface, whereby the valve plate can lift up from the valve seat surface, and the admission channels from the top side and bottom side of the damping valve can have an initial choke inside the connection path. The cross section of the initial choke is defined by the width of an influx opening of the admission channel and the average radial distance between an edge, which determines the valve plate contour, and the inflow opening.

20 Claims, 13 Drawing Sheets

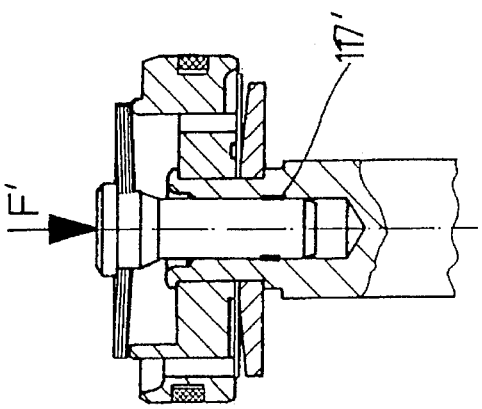
FIG. 11d
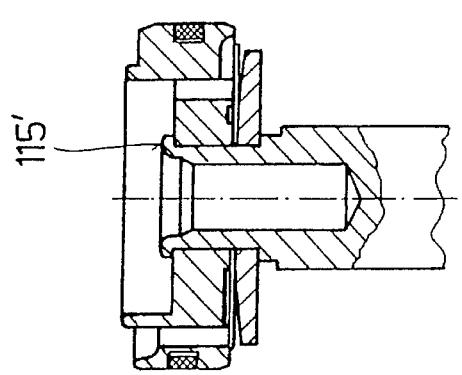
FIG. 11c
FIG. 11b
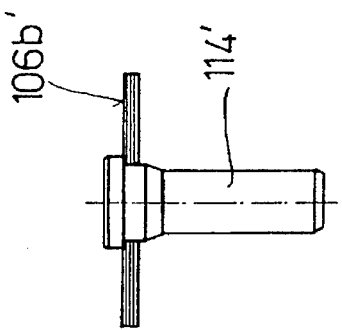
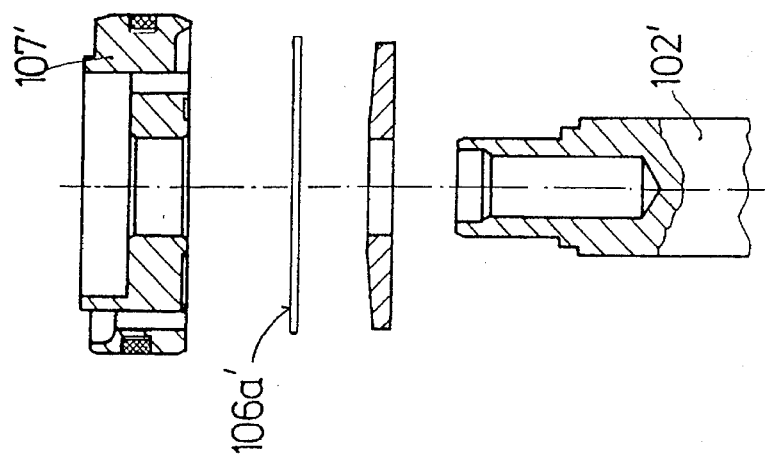
FIG. 11a

VIBRATION DAMPER FOR A MOTOR VEHICLE

CROSS REFERENCE TO RELATED APPLICATION

This application is a continuation-in-part of co-pending application Ser. No. 08/239,365, filed May 6, 1994, in the name of Andreas Förster, Andreas Sieber, Wolfgang Schuhmacher, and Hubert Beck, of which Hubert Beck is the inventor herein, assigned to the assignee of the present invention, and entitled "A Shock Absorber Having A Piston Permanently Attached To Its Piston Rod", which application is incorporated herein by reference.

BACKGROUND OF THE INVENTION

1. Field of the Invention

The present invention generally relates to a vibration damper for a motor vehicle, which vibration damper can typically have a cylinder defining a substantially fluid filled chamber therewithin. A piston rod generally extends into the chamber through one end of the cylinder, and the piston rod preferably has a piston disposed thereon, which piston divides the chamber into two chamber portions. The chamber portion into which the piston is pushed during the insertion of the piston rod into the cylinder can be called the "compression" chamber, while the other chamber portion can be called the "rebound" chamber. In order to provide at least a portion of the damping function of the vibration damper, the piston can have fluid passages disposed therethrough and interconnecting the two chamber portions, whereby fluid flow through the passages is controlled by means of a damping valve.

More particularly, the present invention relates to a damping valve having a valve body with at least one admission channel, or flow passage for each direction of flow of fluid between the two chamber portions. Such admission channels essentially connect a top side and a bottom side of the damping valve body to one another. To provide a valve function, there can be a valve plate on a valve seat surface, whereby the valve plate can lift up off the valve seat surface in essentially one direction of flow, while in the opposite direction of flow, the valve plate can be pressed against the valve seat to close the passage. For the fluid flow passages permitting fluid to flow from the "rebound" chamber to the "compression" chamber, generally from the top side to the underside of the damping valve, there can preferably be a restriction for limiting the flow of fluid therethrough, or in other words, there can be a choke in the passage.

2. Background Information:

German Laid Open Patent Application No. 25 00 826, discloses valve designs of the general type as set forth above. In the valves disclosed therein, a relatively thick valve cover plate covers a ring groove having an internal contour. During assembly operations, this component must still be fed to the robot by hand.

Other known valve designs include coil spring valves of this type, in which valves the choke for the opposite damping valve is realized in the form of an additional disc inside the damping valve. In such a case, the use of a standard valve body which is already provided with non-choke openings is advantageous, because it makes it possible to standardize the damping valve. But the additional component which has the throttle openings and the above-mentioned weak points represents a disadvantage.

Unexamined French Patent Application FR-OS 2 061 905 discloses a valve with a very simple construction. The valve body consists of sheet metal, whereby all the holes are introduced by punching. The thin valve cover disc is penetrated by holes on an inside arc. The valve cover disc can be provided with a variable number of holes. But this valve disc is extraordinarily disadvantageous, since it must be installed in a defined position in relation to the valve body. The installation must once again be performed manually, since the disc does not have a design with a symmetry of rotation which would make it suitable for fully-automatic assembly operations. Because there are holes in the area of the maximum stresses, the durability of the component is severely restricted. There also exists a risk that the valve disc can twist out of position in relation to the valve body, either during the assembly process or during operation, and can result in at least a reduction of the passage cross section, if not a hydraulic blockage.

OBJECT OF THE INVENTION

The object of the present invention is therefore to create a damping valve which makes possible a standard valve body which can be used in a large number of models of damping valves, has a low weight of the moving parts of the valve for a good dynamic characteristic, and contains only individual parts which have symmetry of rotation, thereby making it possible for fully-automatic assembly. It is also an object of the present invention to provide a damping valve which generally has a low number of parts. In addition, the present invention teaches that the parts themselves can be of an extraordinarily simple design.

SUMMARY OF THE INVENTION

The present invention teaches that this object can be accomplished if the cross section of the choke of the valve passages has dimensions which are preferably defined by the width of an inflow opening of the admission channel and the average radial distance between a radial edge which defines the contour of the valve plate, and an outer radial edge of the inflow opening. A standard, and thereby preferably uniform valve body can then preferably be advantageously used for many different damping valves, wherein the size of the choke can be dictated by the diameter of the valve plate.

In addition, since the valve plates can essentially be manufactured as individual components with extreme precision and at a very low cost, the cross sections of the choke openings of a large number of valves are subject to only a small range of variation. Thus, there can essentially be only a small difference in the damping force among the large number of mass-produced valves.

An additional advantageous feature of at least one embodiment of the present invention provides that the inflow opening can preferably be located in the vicinity of the outside diameter of the damping valve body. As such, the outside diameter of the valve plate can essentially define the choke cross section. Consequently, since the arc on which the chokes are located is large, large choke cross sections can be achieved. In a related manner, the influences of the dimensions which determine the choke, in particular the outside diameter of the valve plate, are further reduced, as variations in the dimensions can thus have less effect on the overall opening than the same variations would tend to have on a small cross section.

In an additional advantageous configuration of at least one embodiment of the present invention, the valve plate can preferably be designed elastically as a solid disc, and can thereby be fixed or mounted by means of the inside diameter. Such a disc represents an extremely economical individual component. Because the disc can preferably be solid, the disc can also essentially be relatively thin. As such, the weight of the disc will typically not influence the functional capabilities of the damping valve, and the durability of the component can thus essentially be guaranteed.

An additional advantageous feature provided by at least one additional embodiment of the present invention is that the valve seat surface can preferably be formed by a web labyrinth system. Such a web labyrinth system can serve to separate the admission channels of the two flow directions from one another, while also essentially making it possible to have very large areas of the valve plate which are pressurized when there is flow of fluid through the valve body to the valve body side of the plate. Moreover, since the web labyrinth system essentially minimizes surface contact between the valve plate and the valve body, there are no large contact surfaces on the valve plate which could result in the valve plate sticking to the surface of the valve seat.

Such a web labyrinth system can essentially advantageously have a number of concentrically oriented web segments, whereby there are additional web segments which run radially to separate the admission channels for the different directions of flow. The web labyrinth system, in addition to the formation of the largest possible pressurized surfaces for the valve disc, is also optimized to limit the deflection of the valve plate to a minimum with a small valve seat contact surface.

An additional feature provided by at least one additional embodiment of the present invention is that the damping valve can be provided with a multiplicity of such chokes. In a still further embodiment of the present invention, the largest choke cross section can be formed when the outside diameter of the valve plate is reduced to a point where the outside diameter essentially comes into contact with the outermost circumferential web area for the discharge side for the reverse direction of flow. The web labyrinth system can also advantageously have a radial opening which acts as the choke.

In a further embodiment of the present invention, the cross sections of at least two chokes can advantageously be of different sizes. As a result of this advantageous feature, the bandwidth, or tolerance of the outside diameter of the valve, can be kept small. The admission channels can also preferably be designed so that they are disposed very close to one another within the valve body, without there being a danger of any hydraulic short circuit. In essence, such a short circuit would occur if the damping medium were to bypass the valve disc wherein there would be communication between the admission channels. Only the contact surfaces for the valve disc, which contact surfaces also separate the directional flow passages from one another, are dimensionally limited.

Such a valve as set forth hereabove can essentially be assembled and secured fully automatically with a short cycle time, thus, eliminating the disadvantages of the valves utilized in the past. The assembly can essentially be accomplished by fastening at least some of the valve discs and the valve body on the journal, or piston rod, etc. by means of an essentially non-detachable positive fit, which may alternatively be termed a "deformation fit" or a "force fit".

All the disadvantages of a threaded connection used in the past can essentially be eliminated by the non-detachable positive fit. Likewise, there are essentially no adjustment problems for the valve damping force, since the effect of friction inside the above-referenced threaded connection is preferably essentially eliminated.

To prevent the formation of chips from cutting or machining processes, one advantageous feature of the present invention is that the fastening is preferably a positive fit and/or a weld joint. Such a valve construction can preferably be installed essentially without problems in a piston, and also as a bottom valve in the shock absorber.

The present invention also teaches that the positive fit is preferably formed by the journal. According to an additional advantageous feature of the present invention, the journal preferably has a blind hole, so that a ring wall is formed which ring wall preferably has an overhang in relation to the valve discs and valve body threaded onto it, whereby the overhang can preferably form the positive fit by means of a bead. There is also advantageously an overlap between the blind hole and the valve body. Thus, a bearing force can be achieved which causes an additional axial force, but also essentially eliminates the play which can be present, under some circumstances, between the valve body and the journal.

So that the valve discs cannot be damped uncontrollably, there is preferably at least one supporting ring for the valve discs located inside the row of components axially braced in line. In an additional advantageous embodiment of the present invention, the supporting ring preferably has a rolling contour, so that the damping occurs according to a desired behavior. For example, in one advantageous configuration, the rolling contour can be formed by two connected, essentially conical surfaces. The result is a damping force characteristic which is preferably graduated.

To reduce the manufacturing costs for the valve body, in the function of a piston valve, the piston ring is fastened to the valve body preferably without undercutting. The use of a sintered valve body can also result in major advantages in terms of the sintering dies. For a valve body made of sheet metal, the deforming expense can also essentially be reduced. To increase the allowable axial load of the piston ring, one supporting ring preferably has a fastening surface for the piston ring.

An additional advantageous feature of the present invention is that the supporting ring, with its fastening surface, can preferably be partly supported on the end face of the valve body. The piston ring is thereby preferably excluded from the row of axially braced components of the valve in terms of tolerances.

In an additional configuration, the valve discs facing the piston rod and the valve body are preferably fixed axially.

From a manufacturing point of view, an advantage of the present invention when incorporated on the piston of a shock absorber, is that the cylindrical component is preferably a component of the piston rod. The piston rod can thereby be provided with a journal in the vicinity of its piston, so that this journal can be used for the axial threading of the valve discs and valve body.

One characterizing feature of the present invention is that the cylindrical component is preferably provided with a hole, in which a cylindrical component provided with the valve discs is fastened.

To preferably achieve a positive fit by a non-cutting, forming operation, in one embodiment of the present invention, the cylindrical component is preferably surrounded by the fastening element, and the cylindrical component is expanded from inside to outside.

According to an additional characterizing feature of the invention, the expansion of the cylindrical component is preferably accomplished by means of an expander element located in a hole of the cylindrical component. A sphere can be advantageously used as the expander element.

To further improve the positive fit, preferably between the fastening element and the cylindrical component, the cylindrical component and/or the fastening element is/are provided, preferably on the surfaces facing one another, with at least one projection and/or one recess. The projection and/or the recess preferably run in an annular fashion over the entire circumference.

In an additional configuration, the fastening element is preferably made of light metal or a light metal alloy, and the fastening element is preferably shrink-fitted onto the cylindrical component in an essentially contactless manner by electrically pulsed magnetic fields.

It should be understood that when the word "invention" is used in this application, the word "invention" includes "inventions", that is, the plural of "invention". By stating "invention", Applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a vibration damper for damping vibrations of a motor vehicle, the vibration damper comprising: a first tubular member, the first tubular member comprising first apparatus for attaching the first tubular member to one of: a wheel suspension and a support structure of the motor vehicle; the first tubular member defining a first chamber therewithin, the first chamber comprising damping fluid therewithin, and the first tubular member defining a longitudinal dimension; piston rod apparatus, the piston rod apparatus having a first end within the first tubular member and a second end external to the first tubular member, the piston rod apparatus being movable within the first tubular member in a direction along the longitudinal dimension of the first tubular member; apparatus for attaching the second end of the piston rod apparatus to the other of: the wheel suspension and the support structure of the motor vehicle; piston apparatus disposed at the first end of the piston rod apparatus, the piston apparatus having a first side disposed adjacent the piston rod apparatus and a second side opposite to the first side, and the piston apparatus dividing the first chamber into a first chamber portion adjacent the first side thereof and a second chamber portion adjacent the second side thereof; the piston apparatus comprising: at least one first passage for permitting fluid flow in one direction from the first chamber portion to the second chamber portion, the first side of the piston apparatus comprising a passage opening of the at least one first passage for permitting fluid flow from the first chamber portion into the first passage, the passage opening comprising a constant opening for permitting fluid flow from the first chamber into the at least one first passage, the passage opening having an outer periphery disposed towards the first tubular member and a radially inner edge disposed radially inwardly of the outer periphery; at least one second passage for permitting fluid flow from the second chamber portion to the first chamber portion, the first side of the piston apparatus comprising a valve seat for the at least one second passage; a flexible plate disposed at the first side of the piston apparatus, the flexible plate being configured for bending away from the valve seat to open the second passage upon fluid pressure in the second chamber portion being greater than fluid pressure in the first chamber portion, and the flexible plate being configured for sealing against the valve seat to block flow of fluid through the second passage from the first chamber portion to the second chamber portion, the flexible plate having a peripheral edge disposed towards the first tubular member; and the outer peripheral edge of the flexible plate defining the radially inner edge of the passage opening of the at least one first passage.

Another aspect of the invention resides broadly in a valve for damping fluid flow within a vibration damper of a motor vehicle, the vibration damper comprising a first tubular member, the first tubular member comprising first apparatus for attaching the first tubular member to one of: a wheel suspension and a support structure of the motor vehicle; the first tubular member having a first end and a second end and defining a first chamber therewithin, the first chamber comprising damping fluid therewithin, and the first tubular member defining a longitudinal dimension; piston rod apparatus, the piston rod apparatus having a first end within the first tubular member and a second end extending through the second end of the first tubular member, the piston rod apparatus being movable within the first tubular member in a direction along the longitudinal dimension of the first tubular member; apparatus for attaching the second end of the piston rod apparatus to the other of: the wheel suspension and the support structure of the motor vehicle; piston apparatus disposed at the first end of the piston rod apparatus, the piston apparatus having a first side disposed adjacent the piston rod apparatus and a second side opposite to the first side, and the piston apparatus dividing the first chamber into a first chamber portion adjacent the first side thereof and a second chamber portion adjacent the second side thereof; a second tubular member disposed concentrically about the first tubular member, the second tubular member defining a second fluid chamber between the first and second tubular members; the vibration damper comprising at least one damping valve for at least one of: damping fluid flow between the first and second chamber portions, and damping fluid flow between the first and second chambers, the damping valve comprising: a valve body, the valve body having a first side and a second side; at least one first passage for permitting fluid flow in one direction from the first side of the valve body to the second side of the valve body, the first side of the valve body comprising a passage opening of the at least one first passage for permitting fluid flow from the first side of the valve body into the first passage, the passage opening comprising a constant opening for permitting fluid flow from the first side of the valve body into the at least one first passage, the passage opening having an outer periphery and a radially inner edge disposed radially inwardly of the outer periphery; at least one second passage for permitting fluid flow from the second side of the valve body to the first side of the valve body, the first side of the valve body comprising a valve seat for the at least one second passage; a flexible plate disposed at the first side of the valve body, the flexible plate being configured for bending away from the valve seat to open the second passage upon fluid pressure at the second side of the valve body being greater than fluid pressure at the first side of the valve body, and the flexible plate being configured for sealing against the valve seat to block flow of fluid through the second passage from the first side of the valve body to the second side of the valve body, the flexible plate having an outer peripheral edge; and the outer peripheral edge of the flexible plate defining the radially inner edge of the passage opening of the at least one first passage.

BRIEF DESCRIPTION OF THE DRAWINGS

The present invention is explained below in greater detail, with reference to the accompanying drawings, in which:

FIGS. 11a–11d illustrate the sequence of assembly of one realization of a piston;

DESCRIPTION OF THE PREFERRED EMBODIMENTS

Figure 1A:
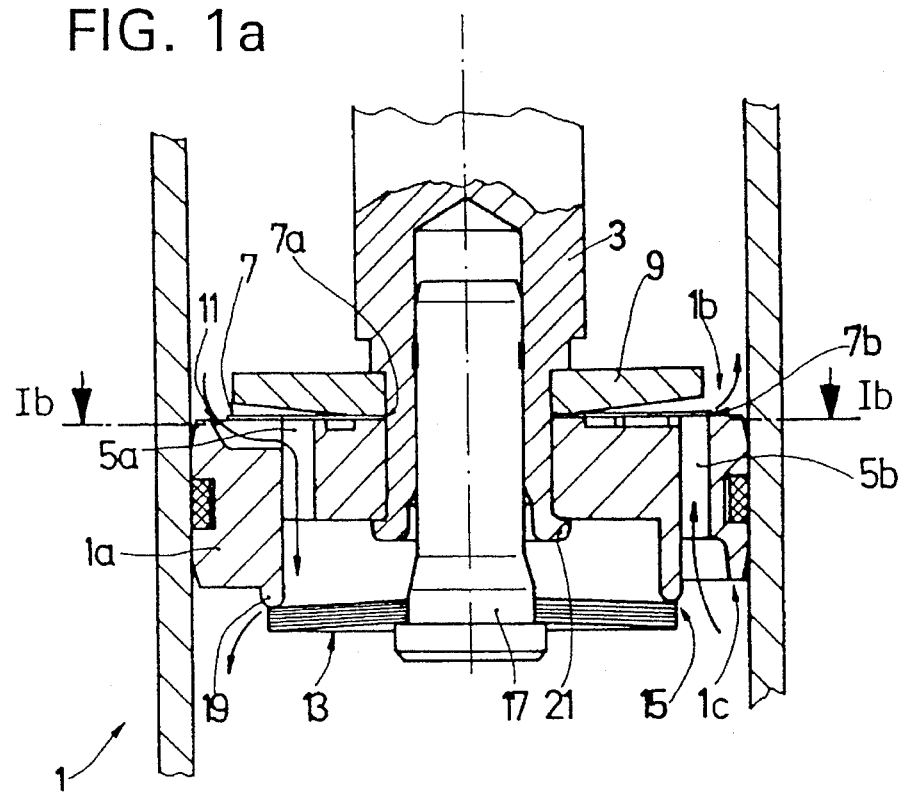
FIGS. 1a and 1b respectively show cross sectional and overhead views of a damping valve on a piston rod.
Figure 1B:
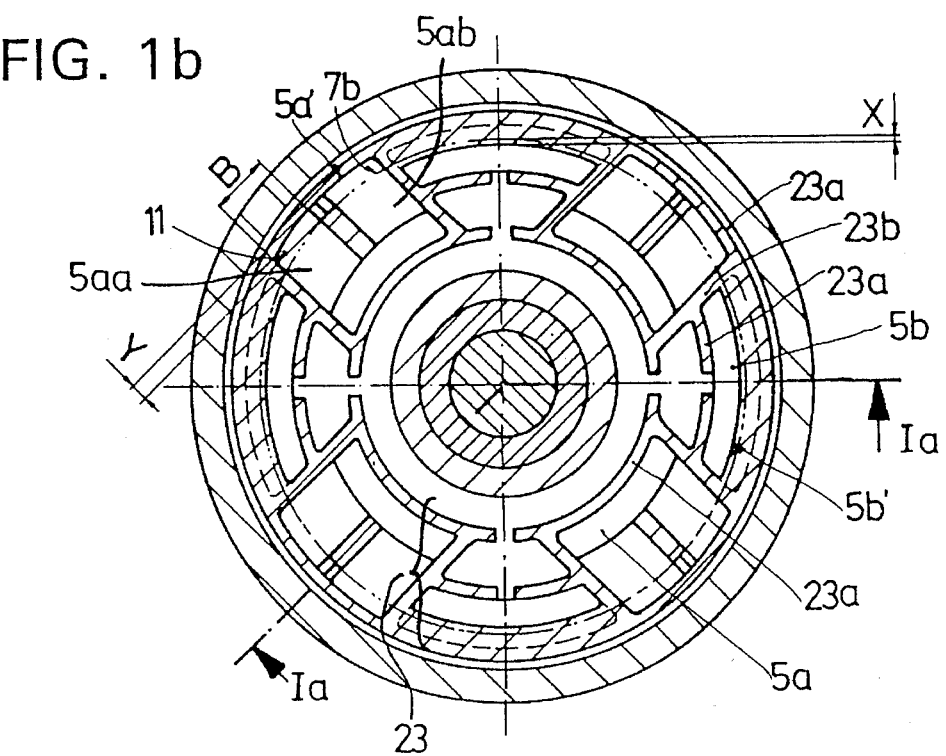
Figure 4:
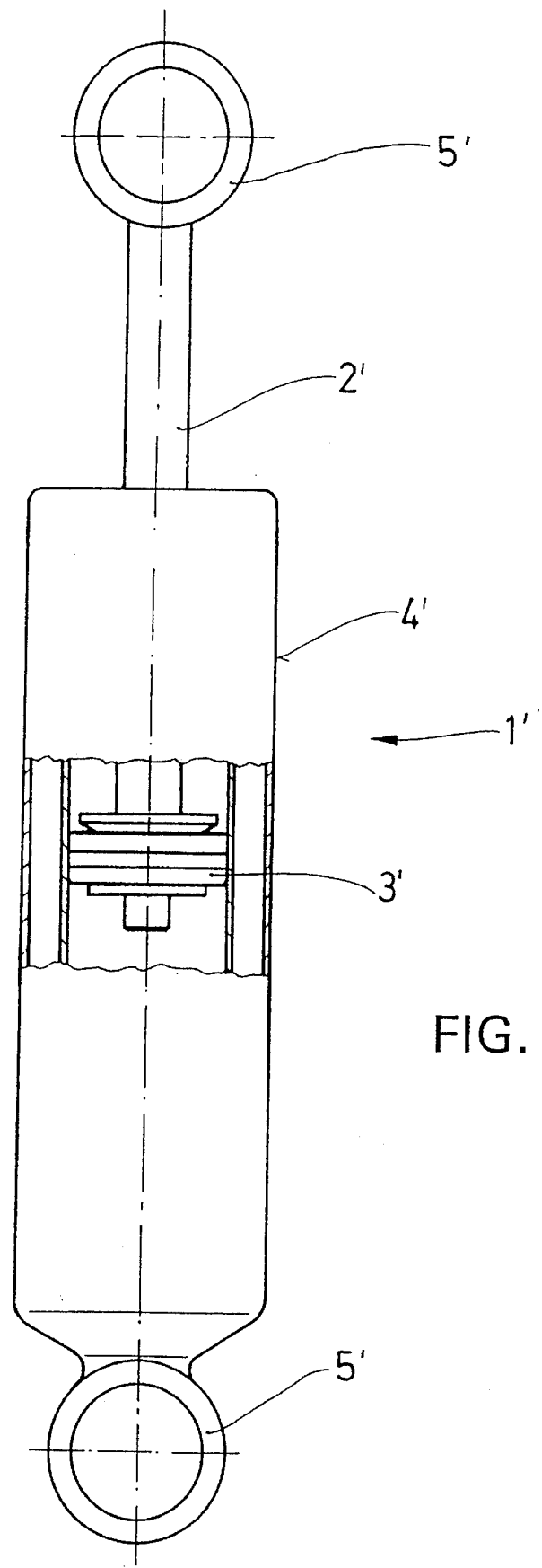
FIG. 4 shows a shock absorber, partly in cross section and partly in a plan view.
Figure 13:
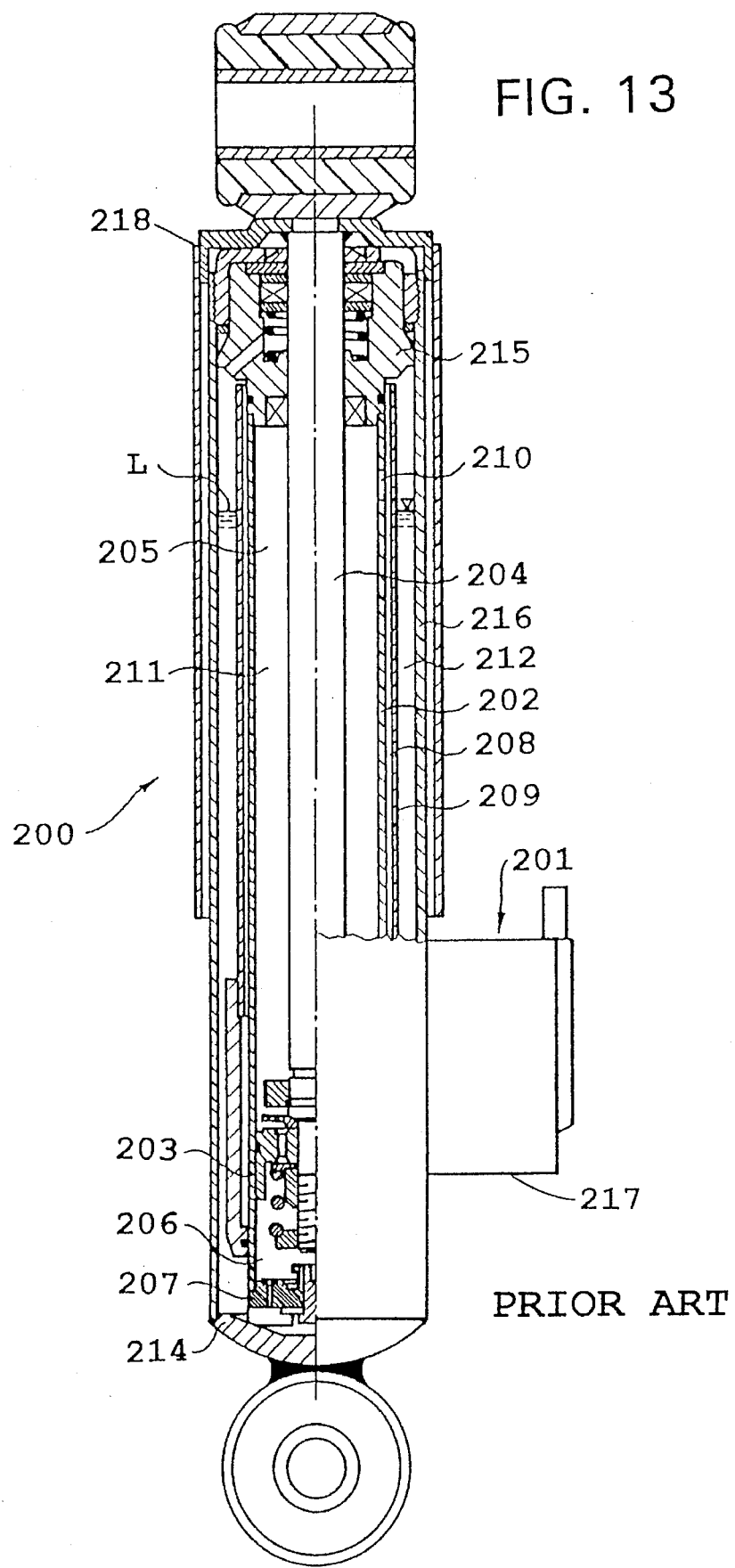
FIG. 13 shows a typical shock absorber in which the embodiments of the present invention could be incorporated.

FIGS. 1a and 1b show a damping valve 1 of a piston rod 3, as could conventionally be used in a vibration damper as depicted in FIGS. 4 and 13. As shown, the damping valve 1 can generally have a damping valve body 1a. The damping valve body 1a can preferably have at least one fluid flow passage, or admission channel 5a, 5b for each direction of flow of fluid through the valve body 1. Each of these admission channels 5a, 5b preferably connects one side 1b of the damping valve body 1a to another side 1c. In a vertically arranged vibration damper, i.e., as shown in FIGS. 4 and 13, the side 1b can generally be the top side, while the side 1c can be the underside. Alternatively, if the vibration damper orientation as shown in FIGS. 4 and 13 were to be reversed, the designations given above would also be reversed.

On at least one side of the body 1a, in this embodiment the top side 1b, there can preferably be a valve plate 7 which can be firmly fixed by means of its inside diameter 7a. In other words, the valve plate 7 can essentially be held in place by means of its inner area, or area disposed about the inside diameter 7a. This valve plate 7 essentially covers the admission channel 5b (or admission channels 5b, when more than one are provided as shown in FIG. 1b). The channels 5b are the channels which have their discharge cross section on the top side 1b of the valve body 1a. Thus, the valve plate 7 can essentially provide the function of a non-return, or check valve.

With such a valve plate 7, the valve plate 7 can thereby preferably be designed as a solid, circular, ring-shaped disc mounted immediately adjacent the valve body 1a. When there is a fluid pressure from the underside 1c, the valve plate 7 can preferably be deflected upwardly to open the passage 5b. The opening movement of the valve plate 7 upwardly is preferably limited by a support plate 9. As such, when a maximum opening position has been reached by the valve plate 7, the valve plate 7 can preferably be supported on the support plate 9. To adapt the damping valve to have different damping valve characteristics, the standard damping valve body 1a can be very easily equipped with valve plates 7 of different thicknesses and rigidities, to thereby make the opening characteristics harder with stiffer plates, or softer with more flexible plates.

For the reverse direction of flow, i.e. from the top side 1b of the damping valve 1 to the underside 1c of the damping valve 1, there is preferably the admission channel 5a and a valve 15, which valve 15 preferably is formed by at least one valve disc 13 fixed to the underside 1c of the damping valve 1. The valve plate 7 can essentially cover at least a portion of the corresponding admission channel 5a, because of the circular dimensions of the valve plate 7. As such, the valve plate 7 can cover the admission channel 5a to the extent that, between the valve plate 7 and the damping valve body 1a, a passage restriction, or choke 11 can be formed in the vicinity of the admission channel 5a.

This restriction, or choke 11 can essentially have an influence on the operation of the valve 15, by controlling the amount of fluid which passes through the passage 5a, and thus, the pressure acting on the valve discs 13. By selecting the outside diameter 7b of the valve plate 7, the cross section of the choke 11 can very easily be determined for a specified standard damping valve body 1a. As such, for providing valves 1 having various damping characteristics, valve plates 7 of different diameters can be used on essentially the same standard valve body 1a. Alternatively, or in addition to the various diameters of the valve plates 7, the rigidity of the valve discs 13 could also be varied on the standard valve bodies 1a, as discussed above.

The damping valve 15, on the underside 1c, can preferably be fixed in place against an encircling edge 19 of the damping valve body 1a by means of a fastening rivet 17, which fastening rivet 17 can be driven into the piston rod 3. This method of assembly, and other alternative methods are discussed further herebelow. The damping valve body 1a can preferably be separately connected to the piston rod 3 by means of a crimp 21. As such, the bias, or prestress of the valve discs 13 can be accomplished independently of the tolerances of the series arrangement of the support plate 9, valve plate 7 and the valve body 1a.

FIG. 1b shows a plan view of the damping valve 1 taken along the line Ib—Ib of FIG. 1. FIG. 1b also depicts, by lines Ia—Ia, the view of reference for FIG. 1a. As shown in FIG. 1b, the valve plate 7 can preferably be supported on a web labyrinth system 23. This web labyrinth system 23 essentially determines the surface area of the valve plate 7 which is pressurized when the inflow of fluid is from the underside 1c of the damping valve 1. In other words, because of the essentially minimal surface area provided by the web labyrinth system 23 for contact with valve plate 7, there can be a substantial amount of surface area of the valve plate 7 which can be pressurized by fluid flowing into passage 5b.

The web labyrinth system 23 is preferably made up of web segments 23a and 23b. The web segments 23a are essentially arranged substantially concentrically inside one another. The web segments 23a can preferably be connected to one another by means of the webs 23b, which webs 23b essentially run substantially radially with respect to the webs 23a. Thus, by means of the orientation of the segments 23a, 23b, the two directional admission channels 5a, 5b can be fluidly separated from one another. The size and location of the web segments 23b are preferably optimized to provide the best possible contact surface for the valve plate 7, so that the valve plate 7, under essentially any circumstances, will not be deflected when fluid flow is admitted on the top side 1b of the damping valve 1.

The web labyrinth system 23 can also essentially guarantee that there will be no sticking effects between the valve plate 7 and the damping valve body 1a, as the contact surfaces are essentially minimized. As mentioned above, there are also very large surfaces on the valve plate 7 which are pressurized. Thus, because of the large surface area which is pressurized and the minimized sticking between the valve plate 7 and the valve body 1a, an easy, and preferably smooth, opening of the valve plate 7 can be made possible. To essentially guarantee that the two admission channel systems 5a, 5b are reliably separated from one another so that no fluid short circuits occur, the valve plate 7 can preferably be larger by a specified dimension X than a neighboring outside diameter 5b' of the pressurized surface on the valve plate 7.

As shown in FIG. 1b, a width B of the admission channel portions 5aa and 5ab, and the average distance Y between the outside diameter 7b of the valve plate 7 and the outside diameter 5a' of the admission channel 5a essentially determines the cross section of the choke 11. As a result of this location of the choke 11 on essentially the largest possible arc of the valve body 1a, the negative effects of manufacturing tolerances can be reduced to a minimum. In other words, slight variations in the size of the passage 5a and the diameter of the valve plate 7 will essentially only minimally affect the overall cross sectional area of the passage choke 11, as compared to possible valves wherein the passage 5a, and choke 11 are disposed more centrally in the valve body 1a.

Figure 2A:
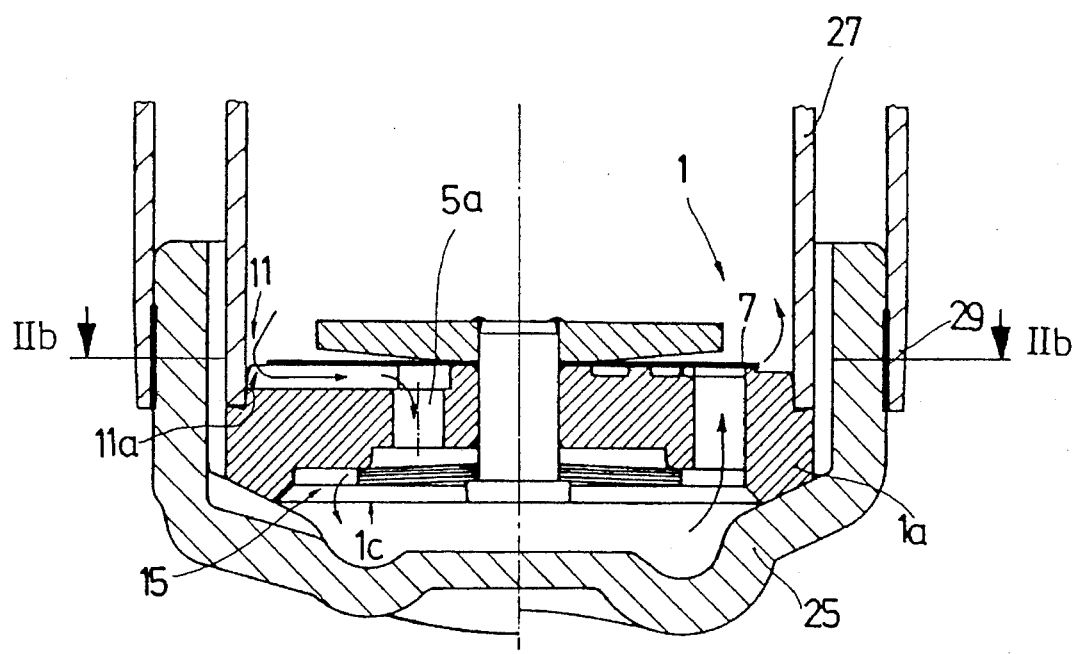
FIGS. 2a and 2b respectively show cross sectional and overhead views of a damping valve in an embodiment as a base valve.
Figure 2B:
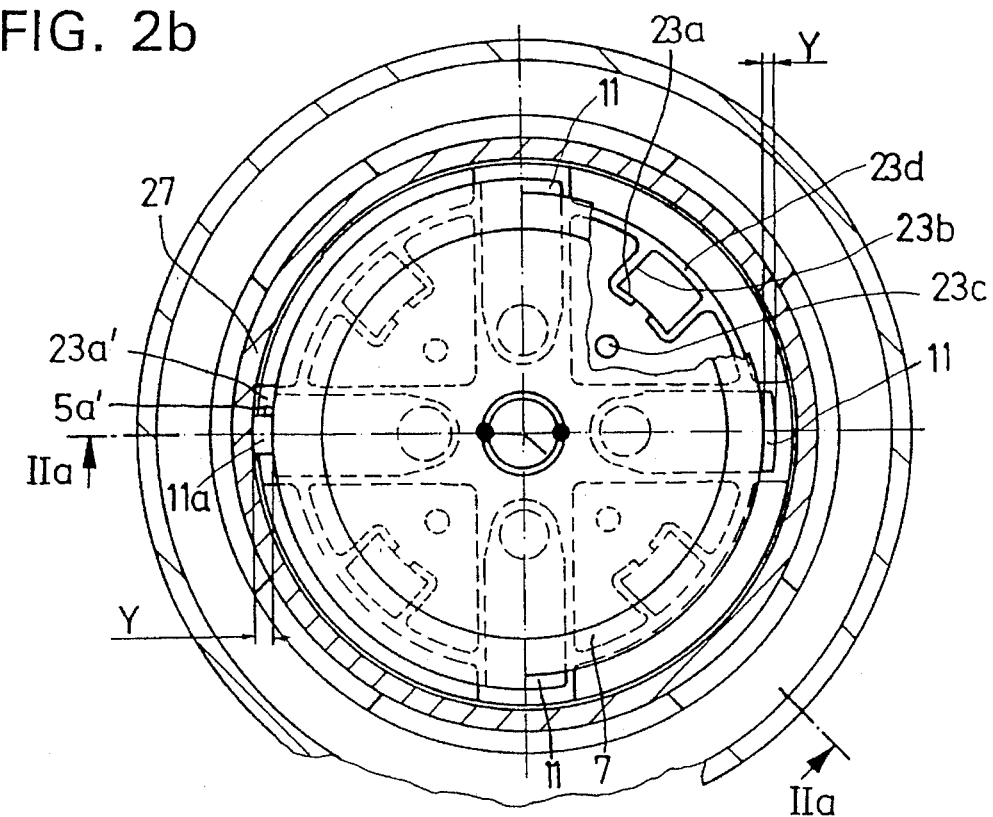

FIGS. 2a and 2b show a damping valve 1 as a base valve of a vibration damper (see full illustration in FIG. 13). Similar to the view shown by FIGS. 1a and 1b, FIG. 2a is a view taken along line IIa—IIa of FIG. 2b, while FIG. 2b is a view taken along line IIb—IIb of FIG. 2a. As shown, the damping valve body 1a can be supported on a base 25 of a vibration damper, which base 25 essentially closes a cylinder tube 27 and a container tube 29, which container tube 29 preferably surrounds the cylinder tube 27.

The basic construction of the valve 1 illustrated in FIGS. 2a and 2b is essentially identical to the valve illustrated in FIGS. 1a and 1b, with a few exceptions. In the valve of FIGS. 2a and 2b, there is a substantially radial passage 11a for the admission channel 5a in the valve body 1a. In a manner as discussed above, this radial passage 11a represents a choke 11 for the damping valve 15 on the underside 1c. This radial passage 11a can preferably be formed in an outermost web 23a' of the web labyrinth system 23, and it can be desirable that only one of the chokes 11 is formed by such a passage 11a.

In the left hand side of the plan view in FIG. 2b, a larger diameter valve plate 7 is shown than the valve plate 7 shown in the right hand side. Thus, it can be seen that the larger the valve plate 7, essentially the smaller the choke 11 to the admission channel 5a, wherein a valve plate could be provided which completely closes off the chokes 11 if so desired. As such, only the radial opening 11a, might be open to the admission channel 5a, while the remaining chokes 11 could be closed off. In the left hand portion of FIG. 2b, since the passage 11a runs essentially radially outwardly to the cylinder 27, the dimension Y would essentially be measured from the edge 7a of the valve plate 7 to the cylinder 27, and not to the inner radial edge 5a' of the outermost web 23a'.

It can generally be understood that, as the outside diameter 7b of the valve plate 7 is reduced in size, the dimension Y increases, so that the cross section of the choke 11 also increases, that is, for chokes 11 having the same dimension B. In essence, since the dimension X (FIG. 1b) must be maintained to prevent short circuits, the valve plate 7 can be reduced in diameter to the point where the choke 11 is maximized, or where the valve plate 7 extends only slightly beyond a next-outermost web 23d.

As shown in FIG. 2b, a multiplicity of chokes 11 can also be used, that is, the chokes 11 can be of various sizes, wherein one of the chokes could have the radial passage 11a. As a result of the different choke cross sections, the damping valve 1 can be tuned very precisely to achieve a specified damping force characteristic. It is particularly advantageous if the smallest choke cross section which achieves the greatest damping action at the maximum speeds, but which is thereby very sensitive to manufacturing tolerances, is formed by a single choke, so that the tolerance defects of the one choke do not accumulate with the tolerance defects of other chokes. The tolerance of the outside diameter 7b can thereby be kept small.

Because of the configuration of the webs 23a, 23b, the admission channels 5a, 5b can be designed so that they are very close to one another without the danger of the occurrence of a hydraulic short circuit in which damping medium bypasses the valve plate 7 and there is communication between the admission channels 5a, 5b. Dimensional limits are set essentially only by the contact surfaces (dimension X) for the valve plate 7 which separate the flow directions from one another.

It should also be noted that in this embodiment, the web system 23 can also preferably provide additional, separate support surfaces 23c, which are designed to prevent a deflection of the valve plate 7.

Figure 3A:
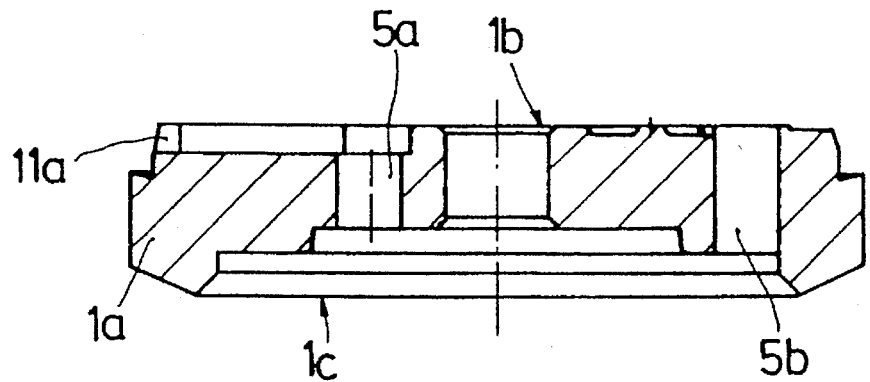
FIGS. 3a and 3b respectively show cross sectional and overhead views of a damping valve body as an individual part.
Figure 3B:
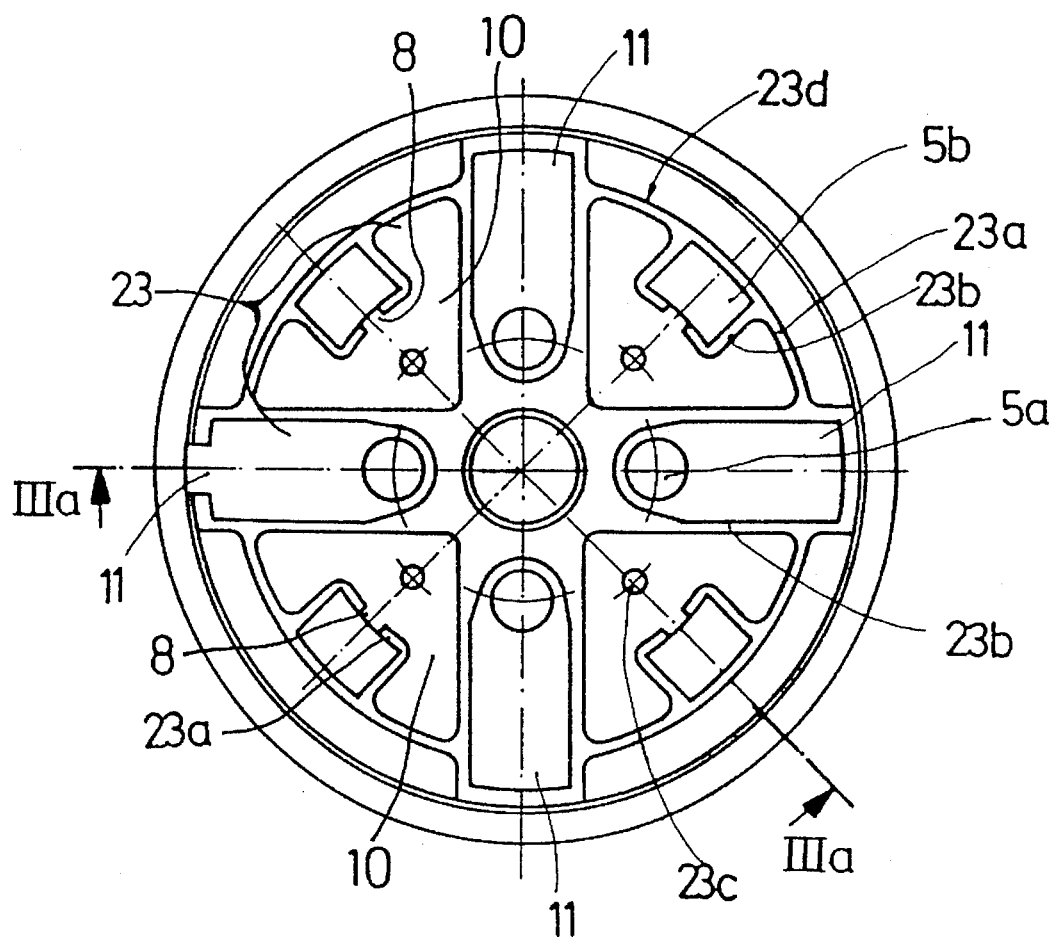

In FIGS. 3a and 3b, wherein view 3a is a cross section taken along line IIIa—IIIa of FIG. 3b, the damping valve body 1a is shown as an isolated part. Because there is a multiplicity of choke cross sections 11, the pressurized surfaces, in particular of the outer web circumferential area 23d, can be set relatively far out radially, so that there is an optimally large pressurizable surface for the valve plate 7. In this embodiment, too, the web labyrinth system 23 has concentrically-oriented web segments 23a which separate the admission channels 5a, 5b from one another by means of webs 23b which run radially. The admission channels 5a, 5b for both directions of flow can thereby be located on a common arc, or at least on arcs which are very close to one another.

In the depicted embodiments of FIGS. 1b, 2b and 3b, it can essentially be seen that the webs 23a and 23b essentially completely surround the passages 5a, in the immediate vicinity of the passages 5a, that is, essentially immediately adjacent the passages 5a. As such, the radial dimension and circumferential dimension of the passages 5a can preferably be minimized, thereby enabling the fluid flowing through passages 5b to come into preferably maximal contact with the underside of the valve plate 7. With the arrangement as shown, it can be possible to provide at least about twenty-five percent of the cross-sectional area of the piston with passages fluidly open to passages 5b. As such, at least about 30% of the surface area of the underside of the valve plate 7 can be pressurized by fluid from the bottom of the piston. By providing alternative configurations of the webs 23a and 23b, it could essentially be possible to enable up to about 50% pressurization of the underside of the valve plate 7.

As shown in FIG. 3b, there can preferably be radial cuts 8 in some of the webs 23a to thereby allow flow of fluid from passages 5b into the inner areas 10 within the web labyrinth system 23. In essence, while it is desirable to maximize the surface of valve plate 7 which is available to be pressurized by fluid from the underside 1c, a compromise must be made with the amount of support provided for supporting the valve plate 7 against a pressure of fluid from the top side 1b. If insufficient support was provided by webs 23a, 23b, 23d, it might be possible that the valve plate 7 would deform downwardly into spaces between the webs, whereby such downward deformations might give rise to adjoining upward deformations which would cause a fluid short circuit between passages 5a and 5b, thereby rendering the valve inoperative. For this reason, the so-called "labyrinth" arrangement has been found to be appropriate and sufficient for providing maximal surface area for being pressurized, while also providing sufficient support against deformations of the valve plate 7.

In the depicted embodiment of FIGS. 1a and 1b, wherein the vibration damper might have a diameter of about 88.5 mm, the outer radius of the passages 5b is about 33.5 mm, and the outer radius of passages 5b is about 37 mm. As such, allowing about 1 mm for overlap dimension X, this leaves about 2.5 mm available for dimension Y. As such, the radius of valve plate 7 can then preferably be varied between about 34.5 mm to about 37 mm to provide variable damping characteristics of the valve of FIGS. 1a and 1b. In the same scale, the dimension B is depicted as being about 9 mm. Thus, the cross-sectional area of passage portions 5aa and 5ab can essentially be between about 0 mm to about 22.5 mm. These dimensions are essentially meant as exemplary, and it should be understood, that one of ordinary skill in the art would readily be able to configure the dimensions X, Y and B, accordingly for vibration dampers having other diameters, etc., as such dimensions could be appropriately kept to the same proportions as provided hereabove. In addition, variations on the proportions of the dimensions could also be readily made depending on the desired damping characteristics to be achieved.

In the depicted embodiment of FIGS. 1a and 1b, essentially all of the components of the valve 1 have a rotational symmetry, with the symmetry of the valve body being repeated at about 90° intervals. As such, during assembly, there would essentially not need to be any rotational alignment operations, and the parts would essentially only need to be aligned axially for insertion of one part onto, or into another. Even in the embodiment of FIG. 3b, wherein one of the chokes 11 is provided with the radial passage 5a, there would still essentially not need to be any rotational alignment, as the circular valve plate 7 would essentially cover the same amount of the chokes 11 in every possible orientation of the valve plate 7 on the valve body 1a. Thus, assembly of the valve 1 can essentially be simplified.

One feature of the invention resides broadly in the damping valve, in particular for a vibration damper, comprising a damping valve body which has at least one admission channel for each direction of flow, which admission channel connects a top side and a bottom side of the damping valve body to one another, a valve plate on a valve seat surface, whereby the valve plate can lift up off the valve seat surface, and a choke inside the connection path between the top side and the underside of the damping valve, characterized by the fact that the cross section of the choke 11 is defined by the width of an inflow opening of the admission channel 5a and the average radial distance Y between an edge 7a, 7b which defines the valve plate contour and the inflow opening.

Another feature of the invention resides broadly in the damping valve characterized by the fact that the choke 11 is located in the vicinity of the outside diameter of the damping valve body 1a, whereby the outside diameter 7b of the valve plate 7 determines the cross section of the choke.

Yet another feature of the invention resides broadly in the damping valve characterized by the fact that the valve plate 7 is made elastic as a solid disc, and is fixed on the inside diameter 7a.

Still another feature of the invention resides broadly in the damping valve characterized by the fact that the valve seat surface is formed by a web labyrinth system 23 which separates the admission channels 5a, 5b of the two directions of flow from one another.

A further feature of the invention resides broadly in the damping valve characterized by the fact that the web labyrinth system 23 consists of concentrically-oriented web segments 23a, which have radially-running web segments 23b to separate the directional admission channels.

Another feature of the invention resides broadly in the damping valve characterized by the fact that the damping valve 1 has a multiplicity of chokes 11.

Yet another feature of the invention resides broadly in the damping valve characterized by the fact that the maximum choke cross section is achieved when the outside diameter 7b of the valve plate 7 comes into contact with the outermost circumferential web 23d which defines the discharge region for the reverse direction of flow.

Still another feature of the invention resides broadly in the damping valve characterized by the fact that the web labyrinth system 23 has a radial opening 11a which acts as the choke.

A further feature of the invention resides broadly in the damping valve characterized by the fact that the cross sections of at least two chokes 11 are of sizes which are different from one another.

FIG. 4 illustrates a shock absorber 1' which preferably includes an external tube 4', a piston 3' fastened to a piston rod 2', and the fastening devices 5' which are preferably fastened to the piston rod 2' and to the external tube 4'.

Figure 5:
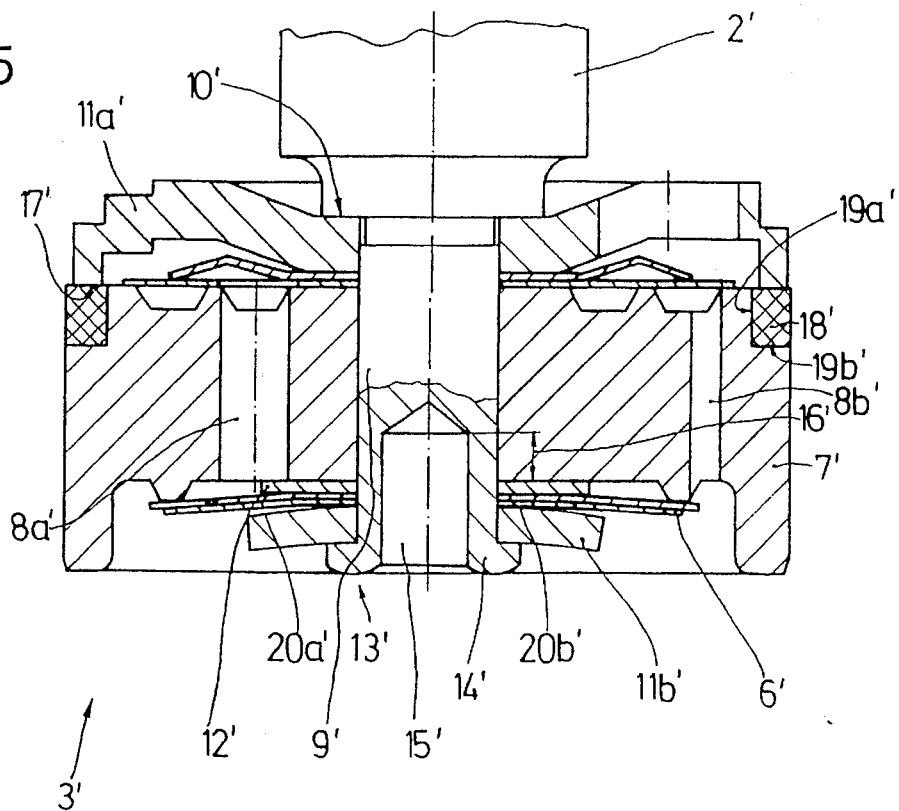
FIGS. 5 and 6 show a piston of a shock absorber in cross section.
Figure 5A:
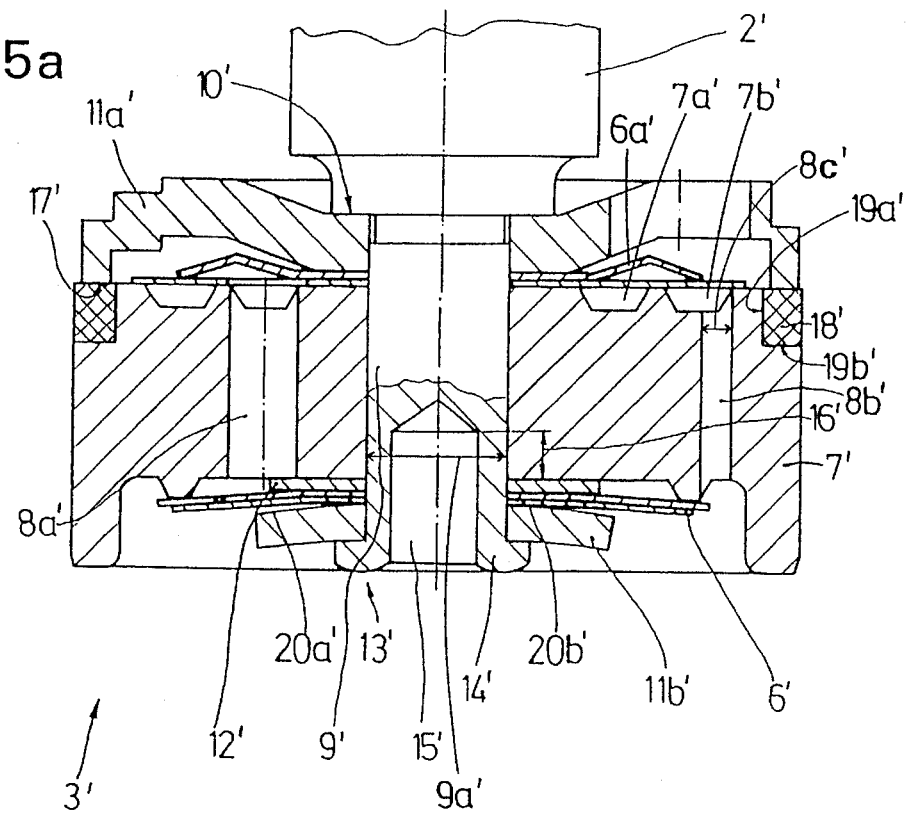
FIGS. 5a and 6a show substantially the same views as FIGS. 5 and 6, respectively, but show additional components.

The piston 3' illustrated in FIGS. 5 and 5a essentially includes a valve body 7', which valve body 7' is preferably provided with passages 8a'/8b', one for each direction of flow. The passages 8a'/8b' are preferably covered at their outlet openings by valve discs 6'. These passages 8a' and 8b' can essentially be similar to the passages 5a and 5b as discussed above with reference to FIGS. 1a, 1b. etc. Depending on the desired damping force setting, valve disc packets or stacks can also be used, whereby valve discs of various thicknesses, graduated diameters or advance opening cross sections can preferably be set inside the packet.

The piston 3' is preferably guided or centered by a journal 9', which journal 9' is a component of the piston rod 2'. A supporting ring 11a' is preferably supported on a shoulder 10' of the piston rod 2', and is preferably adjacent to a series of components consisting essentially of the valve disc packet 6', the valve body 7', a throttle disc 12' and an additional supporting ring 11b'. Preferably, by means of a positive fit 13', the piston 3' is fastened to the piston rod 2'.

The fastening of the piston 3' to the piston rod 2' is preferably achieved by means of a bead 14'. For this bead 14', a blind hole 15' is preferably worked into the journal 9'. This blind hole 15' can advantageously have an overlap 16' with the valve body 7'. During the forming process, which forming process can preferably be forging or possibly coldforging, an additional axial force component is preferably applied, and a compensation of play between the valve body 7' and the journal 9' is thereby achieved by means of bearing forces in the vicinity of the overlap 16', so that the valve body 7' is preferably fixed on all sides.

In other words, as axial force is applied by a suitable tool during forming, the diameter 9a' (see FIG. 5a) of journal 9' is preferably expanded so that any play between the journal 9' and the valve body 7' is substantially decreased, or possibly eliminated. The forming tool is preferably forced into blind hole 15', thereby expanding the walls of journal 9' and simultaneously forming the beads 14'. Thus, the fit between journal 9' and valve body 7' is preferably much tighter than the fit which is typically achieved by a conventional nut arrangement (i.e. a nut threaded onto journal 9'). Thus, any rattles which can be caused by the contact between journal 9' and valve body 7' can preferably be substantially reduced, or eliminated. Further, the present invention essentially permits the valve body 7' to be centered on the journal 9' more accurately, since essentially all play between valve body 7' and journal 9' can be eliminated.

Generally, during the forming process, the journal 9' will preferably expand substantially equally all around its circumference, thereby grasping the valve body 7' of the piston 3' preferably on all sides. The end result is preferably a "mushroomed" shape.

The supporting rings 11a' and 11b', preferably located inside and outside the row of axially braced components, also each preferably perform an additional function. For example, the supporting ring 11a' preferably has a fastening surface 17' as an additional measure to secure a piston ring 18', which piston ring 18' is preferably guided essentially without undercutting, i.e. in this case by means of two contact surfaces 19a' and 19b' on the valve body 7'. With regard to the supporting ring 11b', it should be noted that the ring 11b' preferably has a rolling contour which can be used to influence the damping force characteristic. In this embodiment, the rolling contour is preferably formed by two essentially conical surfaces 20a'/20b'. As a result of this particular shaping process, the damping force characteristic has a progressive curve in the range of higher flow velocities.

Further, in one preferred embodiment as shown in FIG. 5a, the valve body 7' may have two preferably concentric grooves 7a' and 7b'. The grooves 7a' and 7b' may preferably serve to assist in increasing the pressure force generated by passage 8b', since passage 8b' has a relatively small diameter 8c'. The piston 3' may also include a spring body 6a' or possibly a spring valve.

Figure 6:
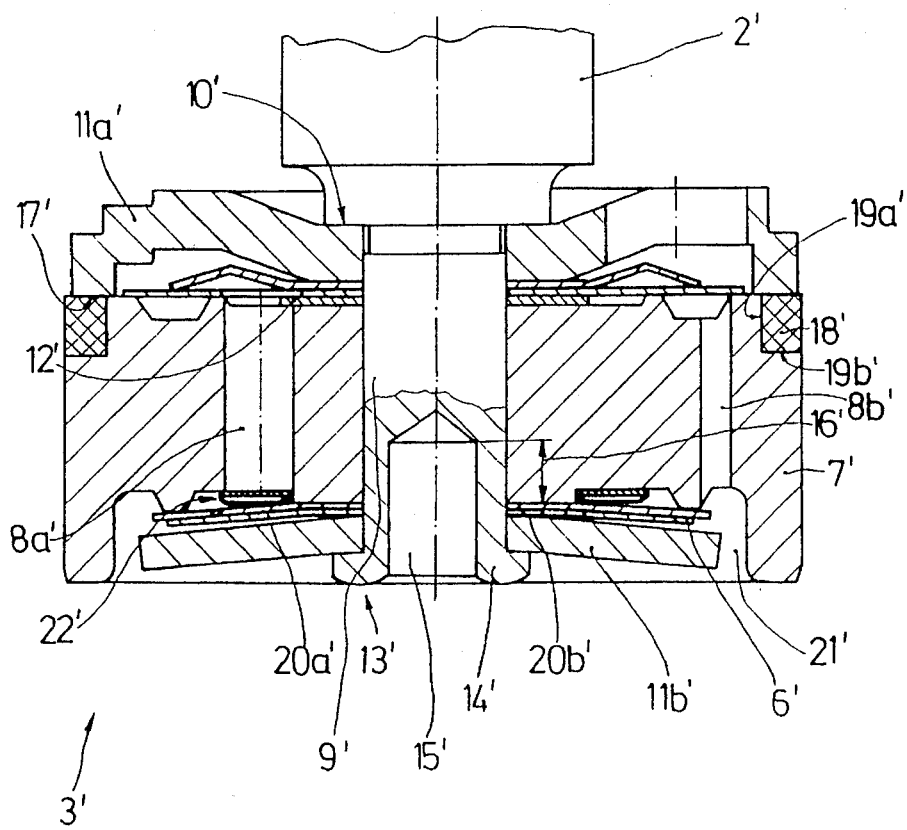
Figure 6A:
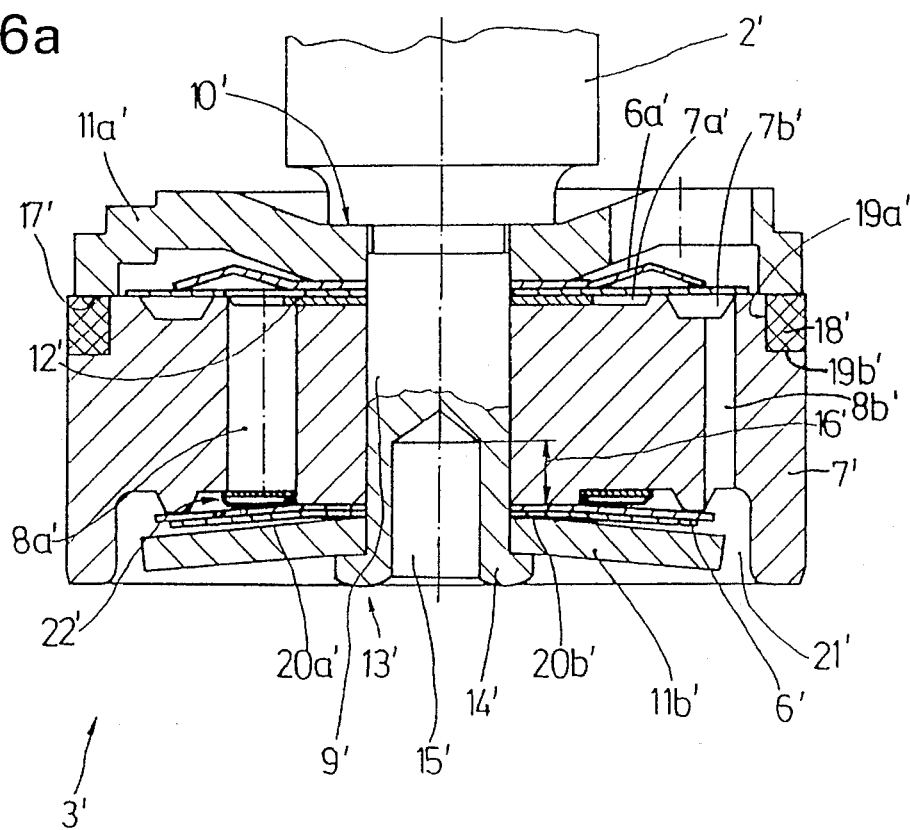

The embodiment illustrated in FIGS. 6 and 6a are essentially distinguished from the embodiment illustrated in FIGS. 5 and 5a in one aspect by the fact that the supporting ring 11a', with its fastening surface 17', is preferably at least partly supported on the end face of the valve body 7'. The fastening surface 17', as well as the contact surfaces 19a' and 19b', preferably form a chamber for the piston ring 18'.

With regard to the piston ring 18', essentially all that needs to be taken into consideration are the contact surface 19a', and the height of the piston ring 18'.

As a variant of the configuration illustrated in FIGS. 5 and 5a, in FIGS. 6 and 6a the throttle disc 12' is preferably shifted toward the supporting ring 11a'.

Thus, the overlap 16' can be preferably significantly increased while retaining the same depth of the blind hole 15', possibly by relocating the throttle disc 12'.

The supporting ring 11b' is also preferably designed so that the decrease in pressure inside the valve occurs over a longer flow distance. The supporting ring 11b', together with the valve body 7', preferably forms an annular gap 21', so that unpleasant flow noises can be suppressed.

To influence the valve characteristic, a return stop 22', preferably in the form of a spring body with a cover disc, can be used, in particular if only small volumes need to be handled in the compression direction.

Of course, it should be understood that the valve design described above can also be employed in a bottom valve. Such a bottom valve may include that shown in FIG. 55 of U.S. Pat. No. 4,650,042, granted to Heinz Knecht et al. on Mar. 17, 1987, or that shown in FIG. 1 of U.S. Pat. No. 4,802,561, granted to Heinz Knecht et al. on Feb. 7, 1989.

Figure 7:
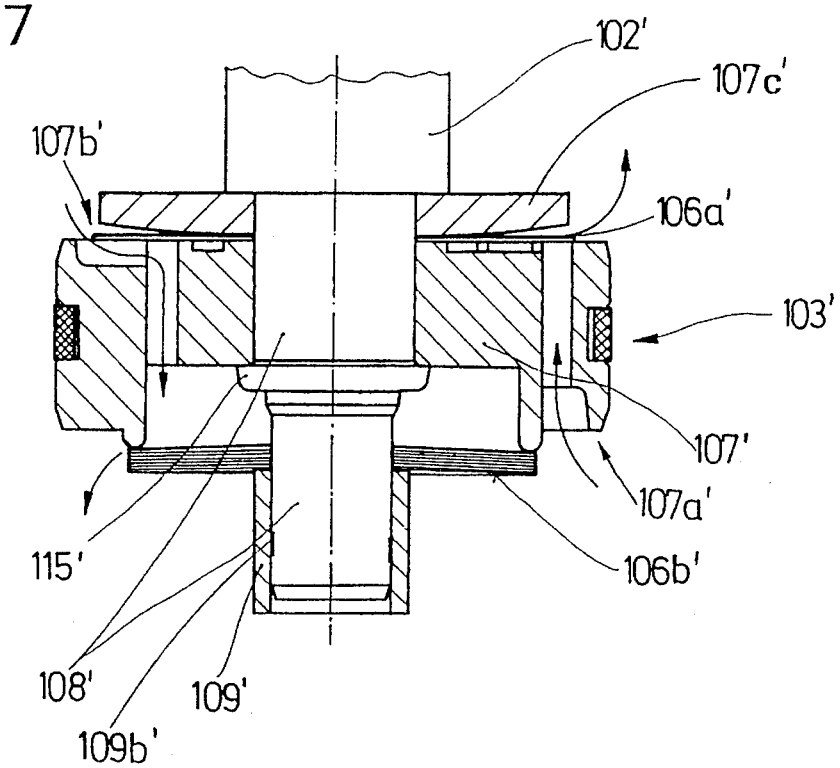
FIGS. 7–10 illustrate various pistons of a shock absorber in cross section.
Figure 7A:
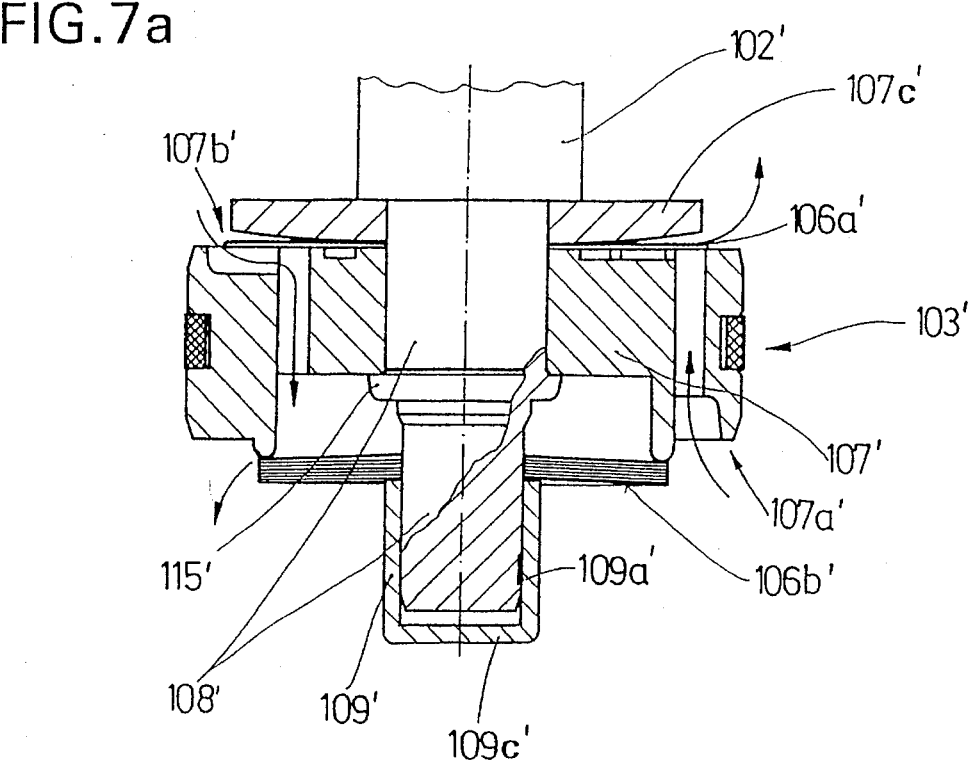
FIG. 7a shows an additional embodiment of a piston similar to that shown in FIG. 7.

FIGS. 7 and 7a illustrate two embodiments of a piston 103' in a two-tube shock absorber. In FIGS. 7 and 7a, the piston 103' is illustrated in cross section, whereby on the piston rod 102' there is a preferably cylindrical component 108', which cylindrical component 108' in this embodiment is configured as a journal of the piston rod 102'. The cylindrical component 108' preferably holds, in the axial direction, the valve disc 106a' and the valve body 107'. The fastening element 109' is preferably pushed onto the cylindrical component 108', and an appropriate prestress is applied. After the application of the corresponding prestress, the fastening of the fastening element 109' preferably to the cylindrical component 108' can be accomplished in the form of a weld joint, e.g. by laser welding, in spots or alternatively over the entire circumference. The two embodiments shown in FIGS. 7 and 7a preferably illustrate an all-around weld seam 109b' and a spot weld 109a' respectively. When an all-around weld seam 109b' is used, the fastening element 109' can preferably be in the form of a sleeve as shown in FIG. 7. If, on the other hand, a spot weld 109a' is used, the fastening element 109' can preferably be in the form of a pot-shaped component as shown in FIG. 7a.

Thus, if a spot weld 109a' is employed, the strength of the fastening element may preferably be increased by including a bottom portion 109c'. Thus, the fastening element preferably has the form of a "pot".

The embodiments illustrated in FIGS. 7 and 7a show that the valve body 107' and the valve discs 106a' are already fastened to the cylindrical component by means of a riveted joint 115'. In an additional assembly step, the valve discs 106b' are preferably prestressed and fastened.

Also shown in FIGS. 7 and 7a are passages 107a' and 107b', one preferably for each direction of flow. The piston 103', in one embodiment thereof, may also include a valve 107c', which valve 107c' may serve to regulate or control the flow through passages 107a' and 107b'. The passages 107a' and 107b', can generally be considered to be similar to the passages 5a and 5b as discussed above with reference to FIGS. 1a and 1b, etc.

Figure 8:
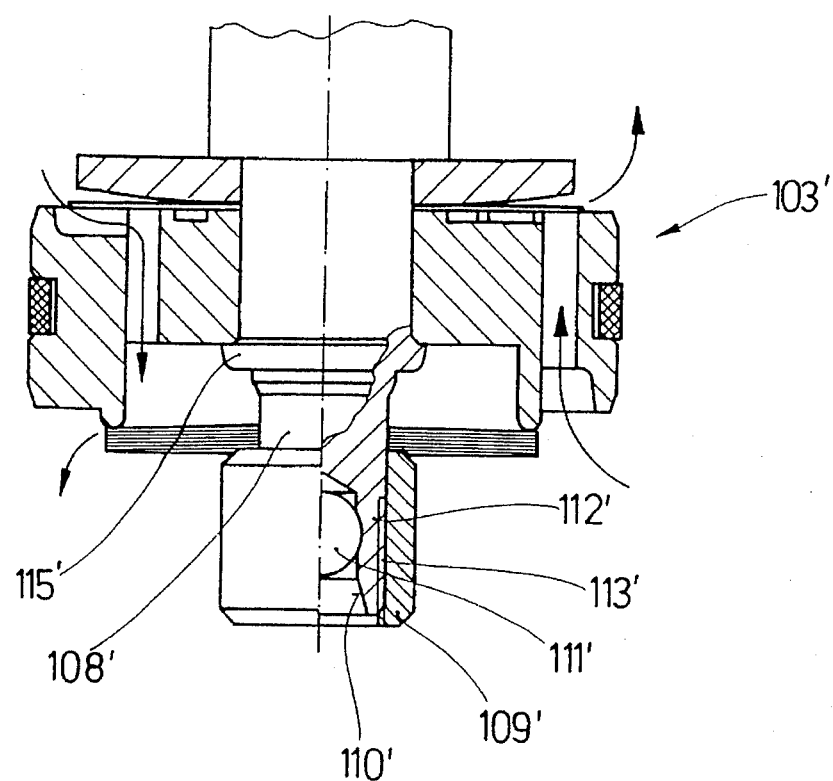
Figure 8A:
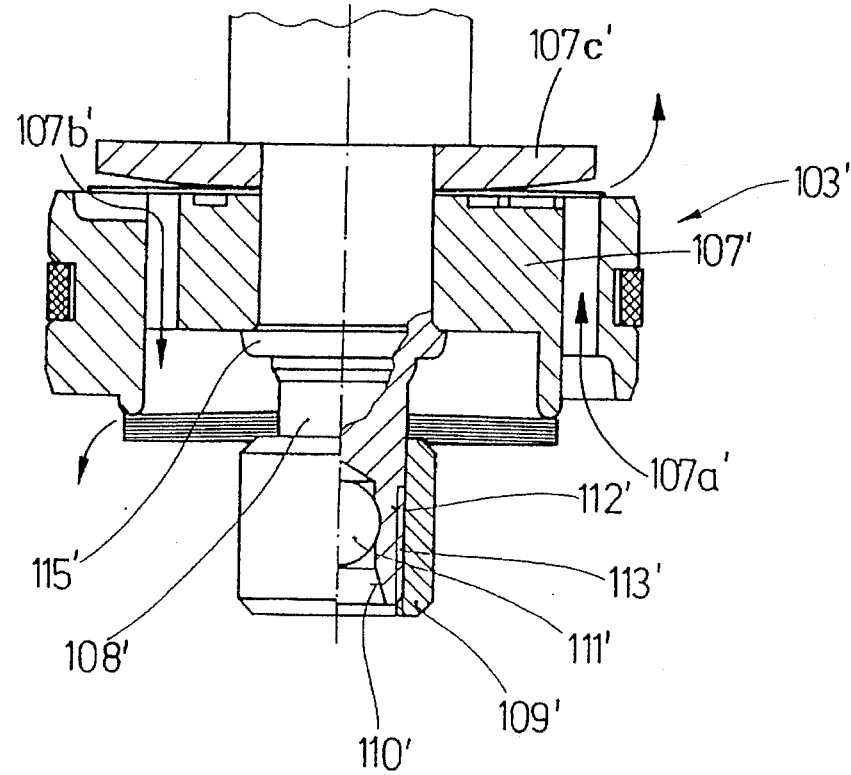
FIGS. 8a, 9a, and 10a show substantially the same views as FIGS. 8–10, but show additional components.

FIGS. 8 and 8a illustrate a piston 103' of a shock absorber, in which the cylindrical component 108' is preferably provided with a hole 110'. A sphere can preferably serve as the expander element 111', and is inserted into this hole 110', so that a positive fit is preferably produced by means of the projections 112' and recesses 113', and by the expansion of the cylindrical component 108' preferably as a result of the pressure exerted by the expander element 111'. This spherical closure illustrated in FIGS. 7 and 7a can also preferably be installed essentially without the generation of any chips which can typically be caused by cutting or machining processes. By means of a corresponding device, or suitable tool, a corresponding pre-stress can be applied to the fastening element 109', whereby the expander element 111', the cylindrical component 108', and the fastening element 109' can then be connected to one another in the respective or desired position. The embodiment illustrated in FIGS. 11a–11d also preferably provided with a riveted joint 115'.

Passages 107a' and 107b' are shown in the embodiment illustrated in FIG. 8a, one passage preferably for each direction of flow. The piston 103', in one embodiment may also have a valve 107c' which valve 107c' can serve to regulate the flow through passages 107a' and 107b'. The passages 107a' and 107b' and the valve 107c' are generally well-known to those of ordinary skill in the art and will not be discussed further here.

Figure 9:
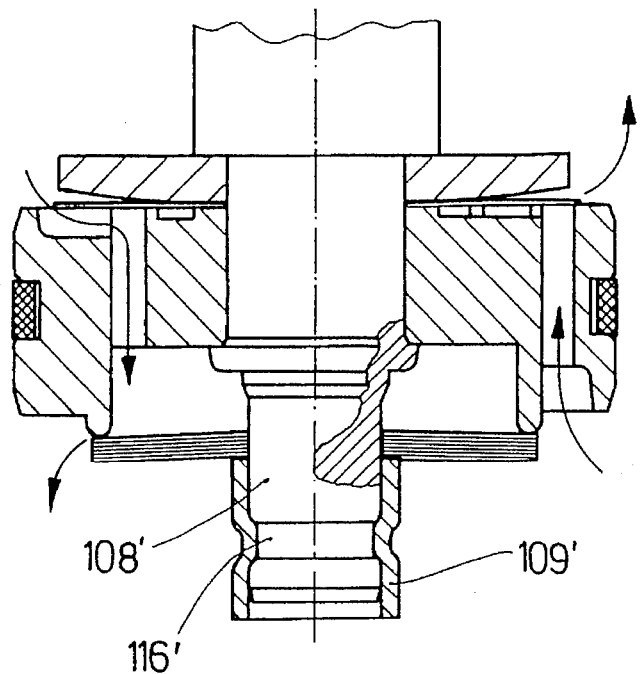
Figure 9A:
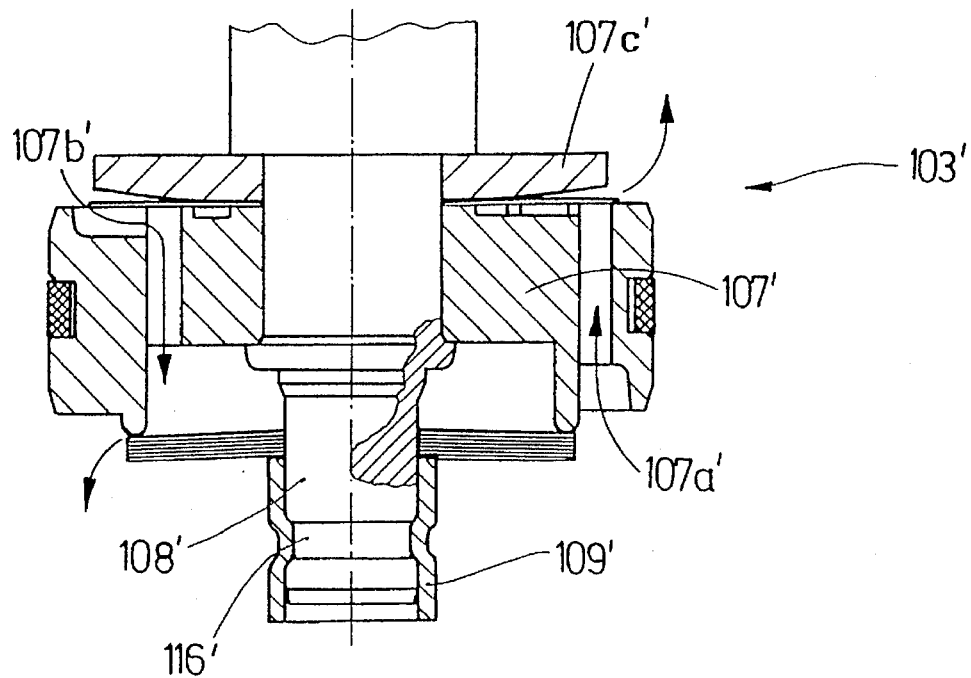

FIGS. 9 and 9a show a fastening element 109' preferably made of light metal or light metal alloy, which fastening element 109' has preferably been shrink-fitted in an essentially contactless manner onto the cylindrical component 108'. The groove 116' of the cylindrical component is thereby preferably used to achieve the positive fit.

The type of fastenings illustrated in FIGS. 9 and 9a may also conceivably be accomplished by a compression fitting of fastening element 109' onto cylindrical component 108'. In this type of fastening, a suitable tool can preferably be used to grasp fastening element 109' and by compression, force fastening element 109' onto cylindrical component 108'.

As shown in FIG. 9a, one embodiment of the present invention may include the valve body 107' having passages 107a' and 107b', one preferably for each direction of flow. The piston 103' may also include a valve 107c', which valve 107c' can preferably serve to regulate or control the flow through passages 107a' and 107b'. The passages 107a' and 107b', and valve 107c' can generally be considered to be similar to the passages 5a and 5b and the valve components 7 and 9 as discussed above with reference to FIGS. 1a and 1b, etc.

Figure 10:
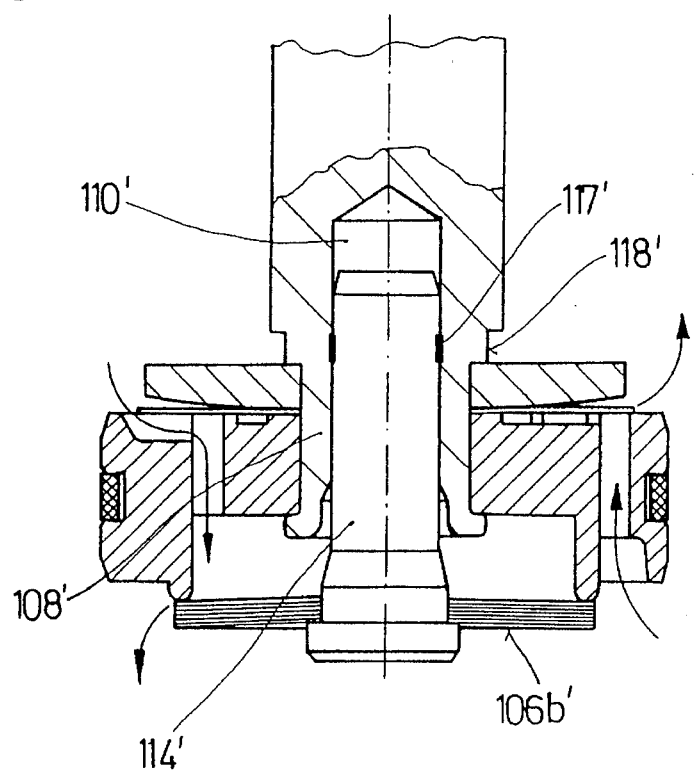
Figure 10A:
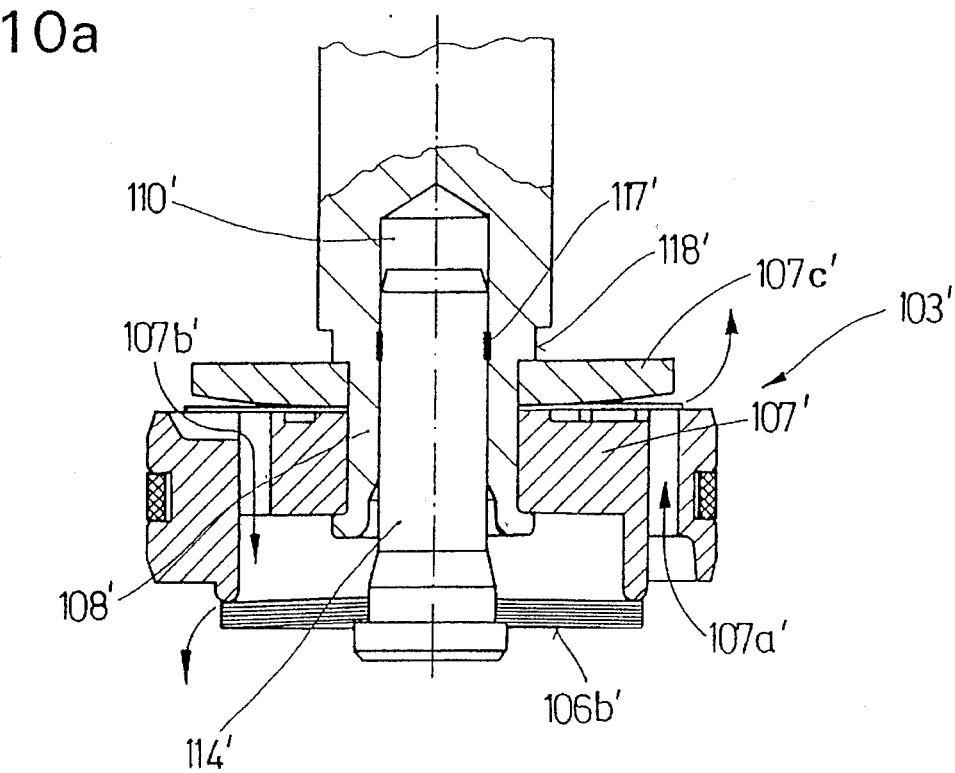

FIGS. 10 and 10a illustrate an additional type of connection, whereby a cylindrical component 114' is preferably housed in the hole 110' of the cylindrical component 108'. After the prestress has preferably been applied by means of the cylindrical component 114' on the valve discs 106b', the fastening can be realized, for example, by means of a laser weld 117'. The shoulder 118' preferably reduces the distance from the outside to the weld point 117', or in different embodiments the shoulder 118' can preferably be used to achieve a distance which is preferably approximately equal along the circumference of the cylindrical component 108'.

As shown in FIG. 10a, one embodiment of the present invention may include the passages 107a' and 107b' of the valve body 107'. The piston 103' may also include a valve 107c'.

FIGS. 11a–11d illustrate one example of the sequence of an automatic assembly process. In FIG. 11a, valve discs 106a' and the valve body 107' are preferably threaded onto the piston rod 102', which are then (FIG. 11b) preferably connected together by means of the riveted joint 115'. The valve discs 106b' are then (FIG. 11c) preferably assembled with the cylindrical element 114'. After the application of a prestress (FIG. 11d), the fastening is preferably performed, e.g. by means of the weld 117'.

Figure 12:
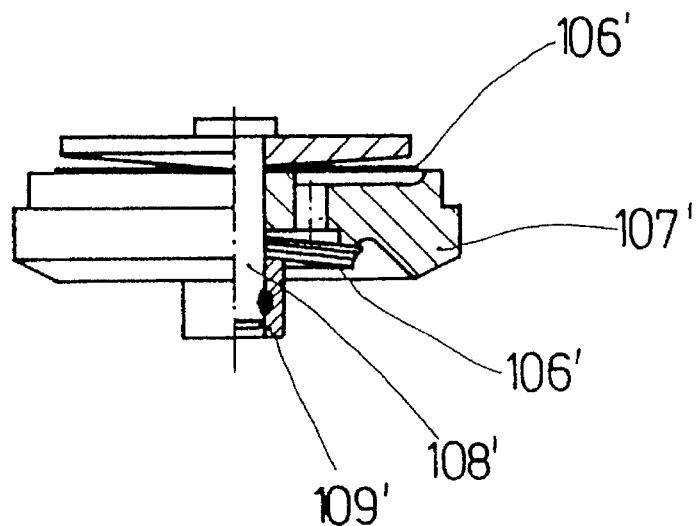
FIG. 12 illustrates a bottom valve of a shock absorber, partly in cross section and partly in a plan view.
Figure 12A:
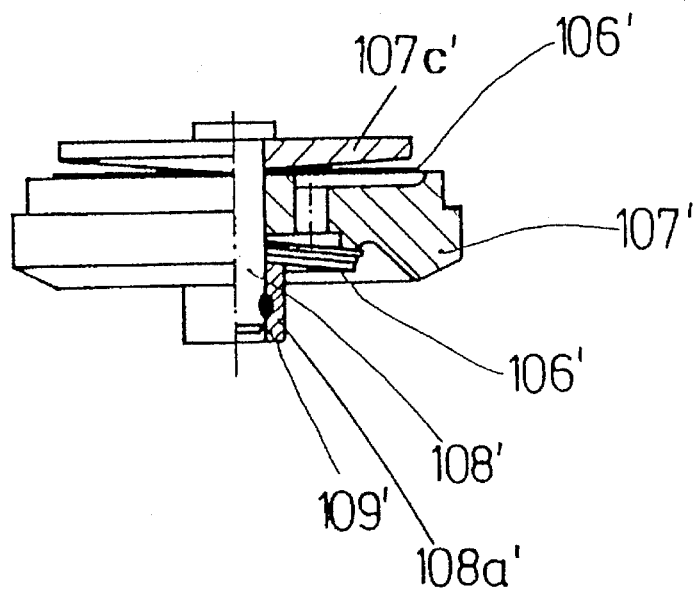
FIG. 12a shows substantially the same view as FIG. 12, but shows additional components.

FIGS. 12 and 12a illustrate a bottom valve, in which bottom valve once again the valve discs 106' and the valve body 107' are preferably inserted onto the cylindrical component 108', and are axially prestressed preferably by means of a fastening element 109' and fastened by means of a weld joint 108a' (see FIG. 12a).

Alternatively, this weld joint 108a' (see FIG. 12a) can preferably be replaced by a positive connection (not shown), in which the fastening element 109' and the cylindrical component 108' are preferably connected by means of an expander element 111', similar to the one illustrated in FIGS. 8 and 8a, which expander element 111' is preferably introduced in a hole (not shown) of the cylindrical component 108'. Here again, it is also possible to shrink fit the fastening element 109' onto cylindrical component 108', similar to the arrangement illustrated in FIGS. 9 and 9a.

Various types of bottom valves in which the present invention may be incorporated in a manner similar to that described with regard to FIGS. 12 and 12a may be disclosed in U.S. Pat. No. 4,802,561 and U.S. Pat. No. 4,650,042, both cited previously herein.

Various types of forming processes which may conceivably be utilized in accordance with the embodiments of the present invention are disclosed in "Metal Forming Fundamentals and Applications", by Altan et al., published by the American Society for Metals in 1983. Pages 8 through 35 describe various forming techniques and methods which may be used to form various components of the present invention.

Various types of forming machines and forming tools which may conceivably be utilized to form various components of the present invention are also discussed in the aforementioned American Society for Metals publication on pages 103, 119, 120, 126, and 174–177. Some examples of forming machines discussed in these pages are screw presses, crank presses, rolling mills, and hammers.

Further, the process of plastic deformation, which process in at least some aspects may apply to the forming of the various components of the embodiments of the present invention, is discussed on pages 45–82 of the aforementioned American Society for Metals publication.

The aforementioned American Society for Metals publication, namely "Metal Forming Fundamentals and Applications", the complete text thereof and the specific pages cited hereinabove, are hereby incorporated by reference as if set forth in their entirety herein.

FIG. 13 shows what could be considered to be a typical shock absorber or vibration damper in which the embodiments of the present invention may conceivably be incorporated. It should be understood that the components discussed hereinbelow with reference to FIG. 13 may essentially be considered to be interchangeable with similar components discussed hereinabove with reference to FIGS. 1 through 12.

FIG. 13 shows an essentially complete shock absorber or vibration damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. Either the piston and/or the bottom valve may comprise the valve unit as discussed above with regard to the present invention. A fluid path 208 is formed between the pressure pipe 202 and an intermediate pipe 209, the intermediate pipe 209 being arranged concentrically with respect to the pressure pipe 202. A connecting orifice 210 in the pressure pipe 202 connects the upper working chamber 211 with the fluid path 208.

A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. The working space 205 is separated by the piston 203 into the upper working chamber 211 and the lower working chamber 206. Both the upper and the lower working chambers are filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211.

The piston rod 204 can also have a protective sleeve 218 attached thereto to essentially protect the piston rod 204 when the piston rod 204 is withdrawn out of the cylinders.

According to an illustrative example, the oscillation damper works as follows: When the piston rod 204 moves upwardly, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high such that a high pressure occurs within the lower working chamber 206 and also within the upper working chamber 211.

By the connecting orifice 210 and the fluid path 208 the upper working chamber 211 is connected with the compensating chamber 212 via the valve unit 201, which can be housed in a housing 217 attached to the container tube 216. Such valve units are generally well known, and are therefore not discussed in any further detail herein. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force is reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. Such, the damping force is again reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

Examples of shock absorber assemblies and components associated therewith, which may be utilized in accordance with the embodiments of the present invention, may be found in the following U.S. Pat. No. 4,986,393, which issued to Preukschat et al. on Jan. 22, 1991; No. 4,749,070, which issued to Moser et al. on Jun. 7, 1988; and No. 4,723,640, which issued to Beck on Feb. 9, 1988.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 04 835.1-12, filed on Feb. 16, 1994, having inventor Hubert Beck, and DE-OS P 44 04 835.1-12 and DE-PS P 44 04 835.1-12, and, if published their published equivalents, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for damping vibrations of a motor vehicle, said vibration damper comprising:

a first tubular member, said first tubular member comprising first means for attaching said first tubular member to one of: a wheel suspension and a support structure of the motor vehicle;

said first tubular member defining a first chamber therewithin, said first chamber comprising damping fluid therewithin, and said first tubular member defining a longitudinal dimension;

piston rod means, said piston rod means having a first end within said first tubular member and a second end external to said first tubular member, said piston rod means being movable within said first tubular member in a direction along said longitudinal dimension of said first tubular member;

means for attaching said second end of said piston rod means to the other of: the wheel suspension and the support structure of the motor vehicle;

piston means disposed at said first end of said piston rod means, said piston means having a first side disposed adjacent said piston rod means and a second side opposite to said first side, and said piston means dividing said first chamber into a first chamber portion adjacent said first side of said piston means and a second chamber portion adjacent said second side of said piston means;

said piston means comprising:

at least one first passage for permitting fluid flow in one direction from said first chamber portion to said second chamber portion, said first side of said piston means comprising a passage opening of said at least one first passage for permitting fluid flow from said first chamber portion into said at least one first passage, said passage opening comprising a constant opening for permitting fluid flow from said first chamber portion into said at least one first passage, said passage opening having an outer periphery disposed towards said first tubular member and a radially inner edge disposed radially inwardly of said outer periphery;

at least one second passage for permitting fluid flow from said second chamber portion to said first chamber portion, said first side of said piston means comprising a valve seat for said at least one second passage;

a flexible plate disposed at said first side of said piston means, said flexible plate being configured for bending away from said valve seat to open said at least one second passage upon fluid pressure in said second chamber portion being greater than fluid pressure in said first chamber portion, and said flexible plate being configured for sealing against said valve seat to block flow of fluid through said at least one second passage from said first chamber portion to said second chamber portion, said flexible plate having a peripheral edge disposed towards said first tubular member;

said peripheral edge of said flexible plate defining said radially inner edge of said passage opening of said at least one first passage;

said piston means defining a longitudinal axis substantially parallel to said longitudinal dimension of said first tubular member;

said first side of said piston means comprising a plurality of wall portions;

at least a portion of said plurality of wall portions extending from said first side of said piston means in a direction parallel to said longitudinal axis of said piston means;

said plurality of wall portions comprising a plurality of webs;

said plurality of webs each having a thickness, a length, and a height, said thickness being substantially less than said length;

said plurality of webs defining a labyrinth of fluid passages on said first side of said piston means;

a first portion of said labyrinth of fluid passages being in fluid communication with said passage opening of said at least one first passage;

said first portion of said labyrinth of fluid passages comprising at least one passage portion extending from said passage opening of said at least one first passage to said at least one first passage;

a first portion of said plurality of webs defining at least part of said at least one passage portion, said first portion of said plurality of webs each being disposed parallel to a radius of said piston means;

a second portion of said labyrinth of fluid passages being in fluid communication with said at least one second passage; and each of said plurality of webs comprising means for separating said at least one first passage from said at least one second passage.

2. The vibration damper according to claim 1 wherein:

said flexible plate defines a plane transverse to said longitudinal axis of said piston means;

said passage opening of said at least one first passage being disposed substantially in said plane of said flexible plate; and said outer periphery of said passage opening of said at least one first passage being stationary with respect to said flexible plate.

3. The vibration damper according to claim 2 wherein:

said first side of said piston means further comprises a passage opening of said at least one second passage for permitting fluid flow from said at least one second passage into said first chamber portion;

said second portion of said labyrinth of fluid passages being in fluid communication with said passage opening of said at least one second passage;

said first portion of said plurality of webs substantially surrounding both said passage opening of said at least one first passage and said at least one passage portion;

a second portion of said plurality of webs defining said passage opening of said at least one second passage;

said first portion of said plurality of webs comprising rectilinear, planar portions; and said second portion of said plurality of webs comprising rectilinear, planar portions.

4. The vibration damper according to claim 3 wherein said plurality of webs are the sole separating means for separating said at least one first passage from said at least one second passage.

5. The vibration damper according to claim 4, wherein:

said piston means has a peripheral portion disposed towards said first tubular member;

said passage opening of said at least one first passage being disposed in said peripheral portion of said piston means;

said outer periphery of said passage opening of said at least one first passage comprises at least one of:

a portion of said first tubular member; and an axial projection of said piston means disposed between said first tubular member and said passage opening of said at least one first passage.

6. The vibration damper according to claim 5, wherein:

said passage opening of said at least one first passage has a radial dimension from said radially inner edge to said outer periphery of said passage opening of said at least one first passage, and said passage opening of said at least one first passage has a circumferential dimension, said radial dimension and said circumferential dimension substantially defining a cross-sectional size of said passage opening of said at least one first passage;

said peripheral edge of said flexible plate defines a radius; and said radius of said peripheral edge of said flexible plate defines said radially inner edge of said passage opening of said at least one first passage with said radial dimension of said passage opening of said at least one first passage extending from said peripheral edge of said flexible plate to said outer periphery of said passage opening of said at least one first passage.

7. The vibration damper according to claim 6, wherein:

said flexible plate comprises a solid disc, said solid disc having an elasticity for permitting bending of said disc away from said valve seat;

said solid disc having a central hole therein, and said piston rod means being disposed through said central hole for mounting said solid disc adjacent said piston means;

said plurality of webs comprise said valve seat;

said solid disc has a surface area disposed towards said piston means;

said second portion of said labyrinth of fluid passages extending from said at least one second passage over a substantial portion of said first side of said piston means; and said plurality of webs being configured to make a substantial portion of said surface area of said solid disc available to be pressurized by fluid pressure of fluid from said second chamber portion flowing through said second portion of said labyrinth of fluid passages.

8. The vibration damper according to claim 7, wherein:

said plurality of webs comprises concentric web portions disposed substantially concentrically about said piston means;

said first portion of said plurality of webs interconnecting ones of said concentric web portions to separate said at least one first passage from said at least one second passage;

said piston means has a cross-sectional area taken substantially transverse to said longitudinal axis;

said second portion of said labyrinth of fluid passages comprise at least about 25% of said cross-sectional area of said piston means;

said surface of said solid disc has a cross-sectional area taken substantially transverse to said longitudinal axis of said piston means; and said second portion of said labyrinth of fluid passages pressurize at least about 30% of said cross-sectional area of said surface of said solid disc.

9. The vibration damper according to claim 8, wherein:

said at least one first passage comprises a plurality of first passages;

said at least one second passage comprises a plurality of second passages;

said at least one passage portion comprises a plurality of passage portions;

each of said first passages comprising a passage opening on said first side of said piston means;

each of said second passages comprising a passage opening on said first side of said piston means;

each of said passage openings of said first passages has a cross-sectional area defined at least partially by said radius of said flexible plate;

said concentric web portions comprise a radially outermost web portion adjoining each of said second passages;

said radially outermost web portion adjoining each of said second passages has a radius;

said solid disc has a minimum radius, said minimum radius of said solid disc being greater than said radius of said radially outermost web portion adjoining each of said second passages;

said passage openings of each of said first passages have a maximum cross-sectional area with said minimum radius of said solid disc;

said plurality of passage portions extend from said first passages to at least one of:

said first tubular member; and said axial projection of said piston means disposed between said first tubular member and said passage opening, said axial projection comprising a radially outermost concentric wall portion of said piston means; and at least one of said passage openings of one of said plurality of first passages has a cross-sectional area different from said cross-sectional areas of the others of said passage openings of said first passages.

10. The vibration damper according to claim 9, wherein:

said piston means has a central concentric portion disposed between said peripheral portion and said central hole;

said plurality of first passages comprise four first passages, each of said four first passages being disposed concentrically with respect to one another within said piston means in said central portion of said piston means;

each of said four first passages comprising a corresponding passage opening disposed radially outwardly of its corresponding first passage;

said plurality of second passages comprise four second passages;

said four second passages being disposed in said peripheral portion of said piston means;

said four first passages with corresponding passage openings being disposed interspaced between said four second passages and at an angular orientation of about 90 degrees with respect to one another;

said four second passages being disposed between ones of said four first passages and at an angular orientation of about 90 degrees with respect to one another;

said four first passages comprises one of:

circumferential slots extending axially through said piston means, each of said circumferential slots having an arc length of about 50 degrees;

axial bores extending through said piston means;

said four second passages comprise circumferential slots extending axially through said piston means, each of said second passage circumferential slots having an arc length of about 50 degrees;

said first portion of said plurality of webs comprise, for each of said passage openings of said first passages, first and second substantially parallel web portions defining lateral sides of said passage portions of said first passages;

said piston means additionally comprises:

means for limiting bending of said flexible plate away from said piston means, said means for limiting bending comprising a substantially rigid disc shaped member disposed about said piston rod means adjacent said flexible plate, said flexible plate being disposed between said means for limiting bending and said piston means;

said second side of said piston means comprises at least one additional valve seat of said first passages;

at least one additional flexible plate disposed adjacent said second side of said piston means, said at least one additional flexible plate being configured for bending away from said additional valve seat to open said first passages upon fluid pressure in said first chamber portion being greater than fluid pressure in said second chamber portion, and said at least one additional flexible plate being configured for sealing against said additional valve seat to block flow of fluid through said first passages from said second chamber portion to said first chamber portion, said at least one additional flexible plate having a peripheral edge disposed towards said first tubular member;

said additional valve seat being disposed radially inwardly of said second passages;

said peripheral edge of said at least one additional flexible plate having a radius extending to said additional valve seat;

at least one peripheral seal extending about said piston means to seal between said piston means and said first tubular member to prevent fluid passage between said peripheral portion of said piston means and said first tubular member; and said piston means, said flexible plate, said plurality of web portions, said first and second passages, said passage openings and said at least one additional flexible plate are all rotationally symmetrical about said longitudinal axis.

11. In a vibration damper of a motor vehicle, a valve for damping fluid flow within the vibration damper, the vibration damper comprising a first tubular member, the first tubular member comprising first means for attaching the first tubular member to one of: a wheel suspension and a support structure of the motor vehicle; the first tubular member having a first end and a second end and defining a first chamber therewithin, the first chamber comprising damping fluid therewithin, and the first tubular member defining a longitudinal dimension; piston rod means, the piston rod means having a first end within the first tubular member and a second end extending through the second end of the first tubular member, the piston rod means being movable within the first tubular member in a direction along the longitudinal dimension of the first tubular member; means for attaching the second end of the piston rod means to the other of: the wheel suspension and the support structure of the motor vehicle; piston means disposed at the first end of the piston rod means, the piston means having a first side disposed adjacent the piston rod means and a second side opposite to the first side, and the piston means dividing the first chamber into a first chamber portion adjacent the first side thereof and a second chamber portion adjacent the second side thereof; a second tubular member disposed concentrically about the first tubular member, the second tubular member defining a second fluid chamber between the first and second tubular members, said valve comprising:

a valve body, said valve body having a first side and a second side;

means for damping fluid flow between one of:
said first and second chamber portions; and
said first and second chambers;

said means for damping fluid comprising:

at least one first passage for permitting fluid flow in one direction from said first side of said valve body to said second side of said valve body, said first side of said valve body comprising a passage opening of said at least one first passage for permitting fluid flow from said first side of said valve body into said at least one first passage, said passage opening comprising a constant opening for permitting fluid flow from said first side of said valve body into said at least one first passage, said passage opening having an outer periphery and a radially inner edge disposed radially inwardly of said outer periphery;

at least one second passage for permitting fluid flow from said second side of said valve body to said first side of said valve body, said first side of said valve body comprising a valve seat for said at least one second passage;

a flexible plate disposed at said first side of said valve body, said flexible plate being configured for bending away from said valve seat to open said at least one second passage upon fluid pressure at said second side of said valve body being greater than fluid pressure at said first side of said valve body, and said flexible plate being configured for sealing against said valve seat to block flow of fluid through said at least one second passage from said first side of said valve body to said second side of said valve body, said flexible plate having an outer peripheral edge;

said outer peripheral edge of said flexible plate defining said radially inner edge of said passage opening of said at least one first passage;

said valve body defining a longitudinal axis extending between said first and second sides thereof;

said first side of said valve body comprising a plurality of wall portions;

at least a portion of said plurality of wall portions extending from said first side of said valve body in a direction parallel to said longitudinal axis of said valve body;

said plurality of wall portions comprising a plurality of webs;

said plurality of webs each having a thickness, a length, and a height, said thickness being substantially less than said length;

said plurality of webs defining a labyrinth of fluid passages on said first side of said valve body;

a first portion of said labyrinth of fluid passages being in fluid communication with said passage opening of said at least one first passage;

said first portion of said labyrinth of fluid passages comprising at least one passage portion extending from said passage opening of said at least one first passage to said at least one first passage;

a first portion of said plurality of webs defining at least part of said at least one passage portion, said first portion of said plurality of webs each being disposed parallel to a radius of said valve body;

a second portion of said labyrinth of fluid passages being in fluid communication with said at least one second passage; and each of said plurality of webs comprising means for separating said at least one first passage from said at least one second passage.

12. In a vibration damper, the valve according to claim 11 wherein:

said flexible plate defines a plane transverse to said longitudinal axis of said valve body;

said passage opening of said at least one first passage being disposed substantially in said plane of said flexible plate; and said outer periphery of said passage opening of said at least one first passage being stationary with respect to said flexible plate.

13. In a vibration damper, the valve according to claim 12 wherein said plurality of webs are the sole separating means for separating said at least one first passage from said at least one second passage.

14. In a vibration damper, the valve according to claim 13 wherein:

said first side of said valve body further comprises a passage opening of said at least one second passage for permitting fluid flow from said at least one second passage to said first side of said valve body;

said second portion of said labyrinth of fluid passages being in fluid communication with said passage opening of said at least one second passage;

said first portion of said plurality of webs substantially surrounding both said passage opening of said at least one first passage and said at least one passage portion;

a second portion of said plurality of webs defining said passage opening of said at least one second passage;

said first portion of said plurality of webs comprising rectilinear, planar portions; and said second portion of said plurality of webs comprising rectilinear, planar portions.

15. In a vibration damper, the damping valve according to claim 14, wherein:

said plurality of webs comprise said valve seat;

said flexible plate has a surface area disposed towards said valve body;

said second portion of said labyrinth of fluid passages extend from said at least one second passage over a substantial portion of said first side of said valve body; and said plurality of webs being configured to provide a substantial portion of said surface area of said flexible plate available to be pressurized by fluid pressure of fluid from said second side of said valve body flowing through said second portion of said labyrinth of fluid passages.

16. In a vibration damper, the damping valve according to claim 15, wherein:

said plurality of webs comprise concentric web portions disposed substantially concentrically about said valve body;

said first portion of said plurality of webs interconnecting ones of said concentric web portions to separate said at least one first passage from said at least one second passage;

said valve body has a cross-sectional area taken substantially transverse to said longitudinal axis;

said second portion of said labyrinth of fluid passages comprise at least about 25% of said cross-sectional area of said valve body;

said surface of said flexible plate has a cross-sectional area substantially transverse to said longitudinal axis of said valve body; and said second portion of said labyrinth of fluid passages pressurize at least about 30% of said cross-sectional area of said flexible plate.

17. In a vibration damper, the damping valve according to claim 16, wherein:

said passage opening of said at least one first passage has a radial dimension from said radially inner edge to said outer periphery of said passage opening of said at least one first passage, and said passage opening of said at least one first passage has a circumferential dimension, said radial dimension and said circumferential dimension substantially defining a cross-sectional size of said passage opening of said at least one first passage;

said outer peripheral edge of said flexible plate defines a radius; and said radius of said outer peripheral edge of said flexible plate defines said radially inner edge of said passage opening of said at least one first passage with said radial dimension of said passage opening of said at least one first passage extending from said outer peripheral edge of said flexible plate to said outer periphery of said passage opening of said at least one first passage.

18. In a vibration damper, the damping valve according to claim 17, wherein:

said valve body is configured for being disposed within the first tubular member;

said valve body has a peripheral portion disposed radially outwardly towards the first tubular member;

said passage opening of said at least one first passage being disposed in said peripheral portion of said valve body;

said outer periphery of said passage opening of said at least one first passage is formed by at least one of:
the first tubular member; and
an axial projection of said valve body disposed between the first tubular member and said passage opening of said at least one first passage.

19. The damping valve according to claim 18, wherein:

said flexible plate comprises a solid disc, said solid disc having an elasticity for permitting bending of said solid disc away from from said valve seat;

said at least one first passage comprises a plurality of first passages;

said at least one second passage comprises a plurality of second passages;

said at least one passage portion comprises a plurality of passage portions;

each of said first passages comprises a passage opening on said first side of said valve body;

each of said second passages comprises a passage opening on said first side of said valve body;

each of said passage openings of said first passages has a cross-sectional area defined at least partially by said radius of said flexible plate;

said concentric web portions comprise a radially outermost web portion adjoining each of said second passages;

said radially outermost web portion adjoining each of said second passages has a radius;

said solid disc has a minimum radius, said minimum radius of said solid disc being greater than said radius of said radially outermost web portion adjoining each of said second passages;

said passage openings of each of said first passages have a maximum cross-sectional area with said minimum radius of said solid disc;

said plurality of passage portions extend from said first passages to at least one of:
the first tubular member; and
said axial projection of said piston means disposed between the first tubular member and said passage opening, said axial projection comprising a radially outermost concentric wall portion of said valve body; and at least one of said passage openings of one of said plurality of first passages has a cross-sectional size different from said cross-sectional size of the others of said passage openings of said first passages.

20. The damping valve according to claim 19, wherein:

said valve body has a center;

said valve body has a central concentric portion disposed between said peripheral portion and said center;

said plurality of first passages comprise four first passages, each of said four first passages being disposed concentrically with respect to one another within said valve body in said central portion of said valve body;

each of said four first passages comprising a corresponding passage opening disposed radially outwardly of its corresponding first passage;

said plurality of second passages comprise four second passages;

said four second passages being disposed in said peripheral portion of said valve body;

said four first passages with corresponding passage openings being disposed interspaced between said four second passages and at an angular orientation of about 90 degrees with respect to one another;

said four second passages being disposed between ones of said four first passages and at an angular orientation of about 90 degrees with respect to one another;

said four first passages comprises one of:
circumferential slots extending axially through said valve body, each of said circumferential slots having an arc length of about 50 degrees;
axial bores extending through said valve body;

said four second passages comprise circumferential slots extending axially through said valve body, each of said second passage circumferential slots having an arc length of about 50 degrees;

said first portion of said plurality of webs comprise, for each of said passage openings of said first passages, first and second substantially parallel wall portions defining lateral sides of said passage portions of said first passages;

said valve body additionally comprises:
means for limiting bending of said flexible plate away from said valve body, said means for limiting bending comprising a substantially rigid disc shaped member disposed adjacent said flexible plate, said flexible plate being disposed between said means for limiting bending and said valve body;
said second side of said valve body comprises at least one additional valve seat of said first passages;
at least one additional flexible plate disposed adjacent said second side of said valve body, said at least one additional flexible plate being configured for bending away from said additional valve seat to open said first passages upon fluid pressure at said first side of said valve body being greater than fluid pressure at said second side of said valve body, and said at least one additional flexible plate being configured for sealing against said additional valve seat to block flow of fluid through said first passages from said second side of said valve body to said first side of said valve body, said at least one additional flexible plate having a peripheral edge disposed towards the first tubular member;
said additional valve seat being disposed radially inwardly of said second passages;
said peripheral edge of said at least one additional flexible plate having a radius extending to said additional valve seat;
at least one peripheral seal extending about said valve body to seal between said valve body and the first tubular member to prevent fluid passage between said peripheral portion of said valve body and the first tubular member;

said valve body, said flexible plate, said plurality of web portions, said first and second passages, said passage openings and said at least one additional flexible plate are all rotationally symmetrical about said longitudinal axis; and said valve body comprises one of:
a piston valve for being disposed in, or forming a body of said piston means for damping fluid flow between said first and second chamber portions; and
a bottom valve for being disposed at said first end of the first tubular member for damping fluid flow between said first chamber and said second chamber.

* * * * *

UNITED STATES PATENT AND TRADEMARK OFFICE
CERTIFICATE OF CORRECTION

PATENT NO. : 5,595,269
DATED : January 21, 1997
INVENTOR(S) : Hubert BECK

It is certified that error appears in the above-indentified patent and that said Letters Patent is hereby corrected as shown below:

On the title page, item [57], line 4 under the "ABSTRACT" section, after 'channel', delete "connectes" and insert --connects--.

In column 8, line 55, after the first occurrence of 'FIG.', delete "1." and insert --1a.--.

Signed and Sealed this

Twenty-ninth Day of April, 1997

Attest:

BRUCE LEHMAN

*Attesting Officer*    *Commissioner of Patents and Trademarks*